Nov. 6, 1962 J. C. MYRICK 3,062,913

HIGH SPEED SERIAL BINARY COMMUNICATION SYSTEM FOR VOICE FREQUENCY CIRCUITS

Filed March 10, 1960 24 Sheets-Sheet 1

INVENTOR
J.C. Myrick

BY Homer R. Montague
ATTORNEY

Nov. 6, 1962 J. C. MYRICK 3,062,913

HIGH SPEED SERIAL BINARY COMMUNICATION SYSTEM FOR VOICE FREQUENCY CIRCUITS

Filed March 10, 1960 24 Sheets-Sheet 2

INVENTOR
J.C. Myrick

BY Homer R. Montague
ATTORNEY

Nov. 6, 1962 J. C. MYRICK 3,062,913

HIGH SPEED SERIAL BINARY COMMUNICATION SYSTEM FOR VOICE FREQUENCY CIRCUITS

Filed March 10, 1960 24 Sheets-Sheet 3

INVENTOR
J.C. Myrick

BY Homer R. Montague
ATTORNEY

INVENTOR
J. C. Myrick
BY Homer R. Montague
ATTORNEY

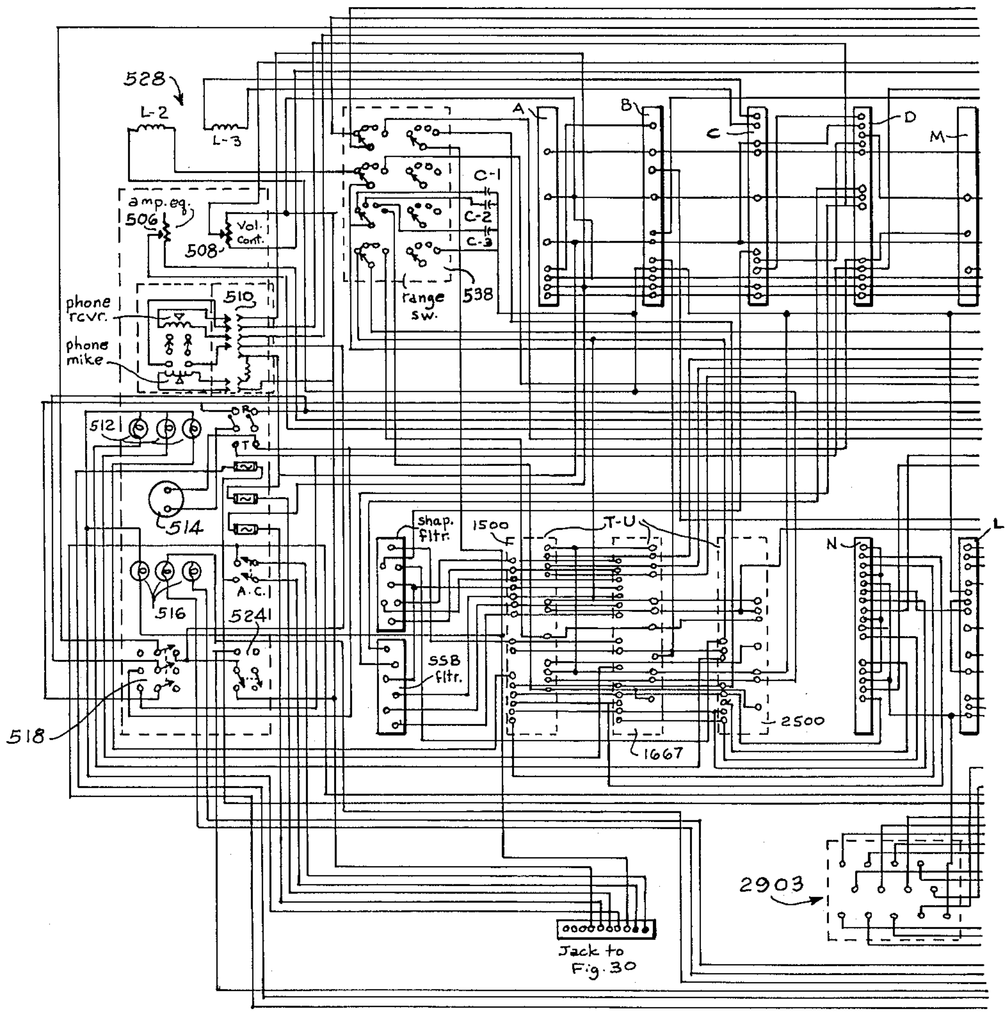
Fig. 7-A
INVENTOR
J.C. Myrick
BY Homer R. Montague
ATTORNEY

Nov. 6, 1962 J. C. MYRICK 3,062,913
HIGH SPEED SERIAL BINARY COMMUNICATION SYSTEM FOR VOICE FREQUENCY CIRCUITS
Filed March 10, 1960 24 Sheets-Sheet 6
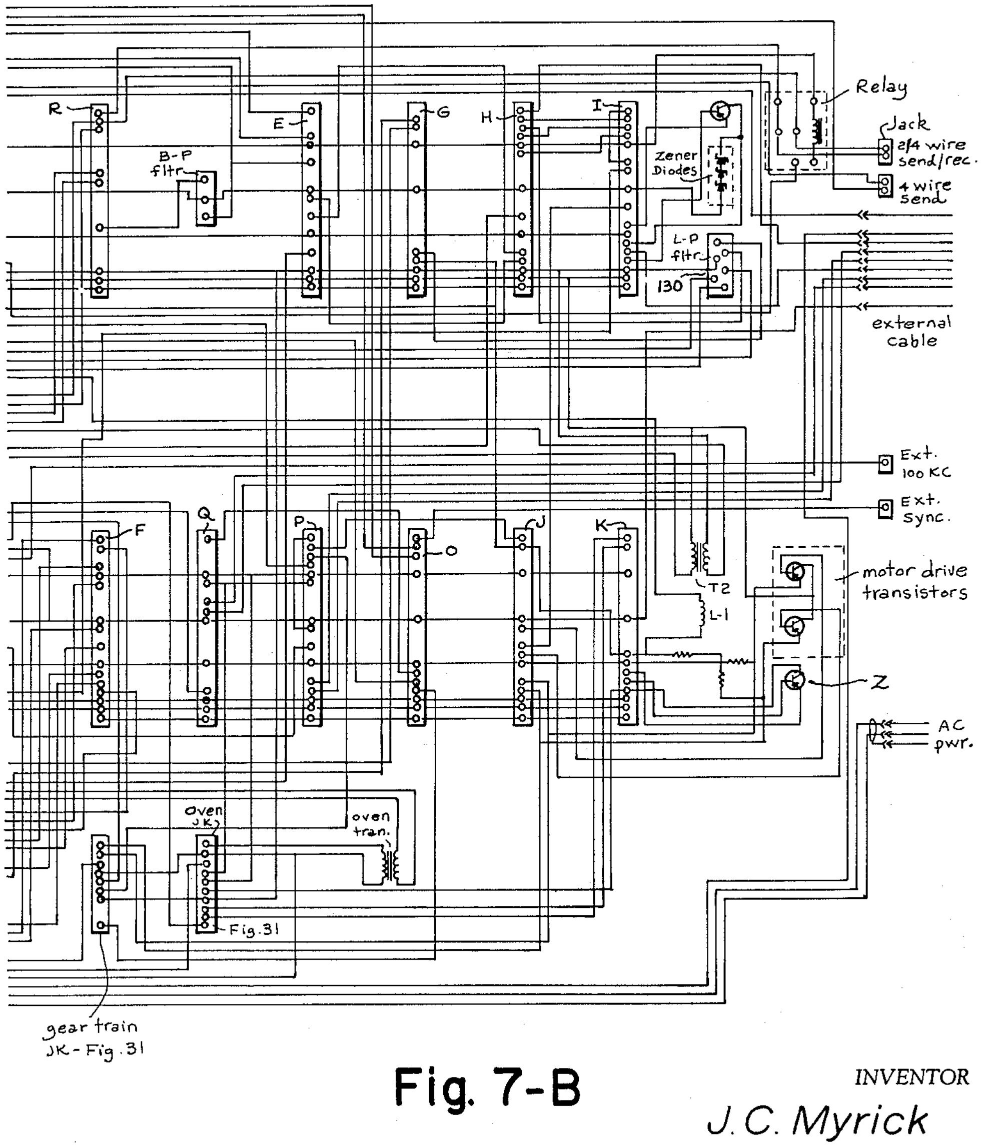
Fig. 7-B
INVENTOR
J. C. Myrick
BY Homer R. Montague
ATTORNEY INVENTOR
J.C. Myrick
BY Homer R. Montague
ATTORNEY

B

INVENTOR
J.C.Myrick

BY Homer R. Montague
ATTORNEY

Nov. 6, 1962 J. C. MYRICK 3,062,913

HIGH SPEED SERIAL BINARY COMMUNICATION SYSTEM FOR VOICE FREQUENCY CIRCUITS

Filed March 10, 1960 24 Sheets-Sheet 9

INVENTOR

J.C. Myrick

BY Homer R. Montague

ATTORNEY

E

INVENTOR
J.C. Myrick
BY Homer R. Montague
ATTORNEY

F

INVENTOR
J.C. Myrick
BY Homer R. Montague
ATTORNEY

G

INVENTOR
J.C. Myrick

BY Homer R. Montague
ATTORNEY

H

INVENTOR
J.C. Myrick

BY Homer R. Montague
ATTORNEY

INVENTOR
J. C. Myrick
BY Homer R. Montague
ATTORNEY

Nov. 6, 1962 J. C. MYRICK 3,062,913

HIGH SPEED SERIAL BINARY COMMUNICATION SYSTEM
FOR VOICE FREQUENCY CIRCUITS

Filed March 10, 1960 24 Sheets-Sheet 15

INVENTOR

J. C. Myrick

BY Homer R. Montague

ATTORNEY

K

INVENTOR
J. C. Myrick
BY Homer R. Montague
ATTORNEY

Nov. 6, 1962 J. C. MYRICK 3,062,913

HIGH SPEED SERIAL BINARY COMMUNICATION SYSTEM FOR VOICE FREQUENCY CIRCUITS

Filed March 10, 1960 24 Sheets-Sheet 17

(L)

INVENTOR

J.C. Myrick

BY Homer R. Montague

ATTORNEY

Nov. 6, 1962 J. C. MYRICK 3,062,913
HIGH SPEED SERIAL BINARY COMMUNICATION SYSTEM
FOR VOICE FREQUENCY CIRCUITS
Filed March 10, 1960 24 Sheets-Sheet 18

M

N

INVENTOR
J.C. Myrick

BY Homer R. Montague
ATTORNEY

Nov. 6, 1962 J. C. MYRICK 3,062,913
HIGH SPEED SERIAL BINARY COMMUNICATION SYSTEM
FOR VOICE FREQUENCY CIRCUITS
Filed March 10, 1960 24 Sheets-Sheet 19

INVENTOR
J.C. Myrick
BY Homer R. Montague
ATTORNEY

P

INVENTOR
J.C. Myrick

BY Homer R. Montague
ATTORNEY

Q

INVENTOR
J.C. Myrick
BY Homer R. Montague
ATTORNEY

Ⓡ Fig. 25
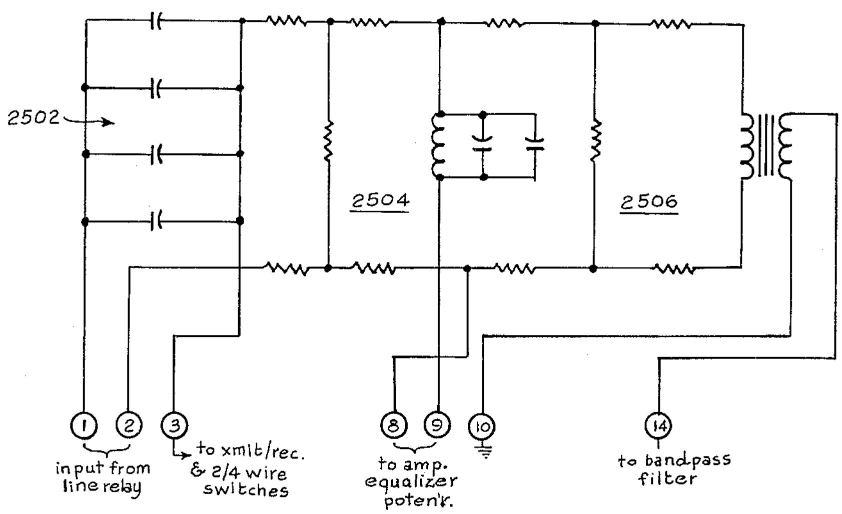
Fig. 26
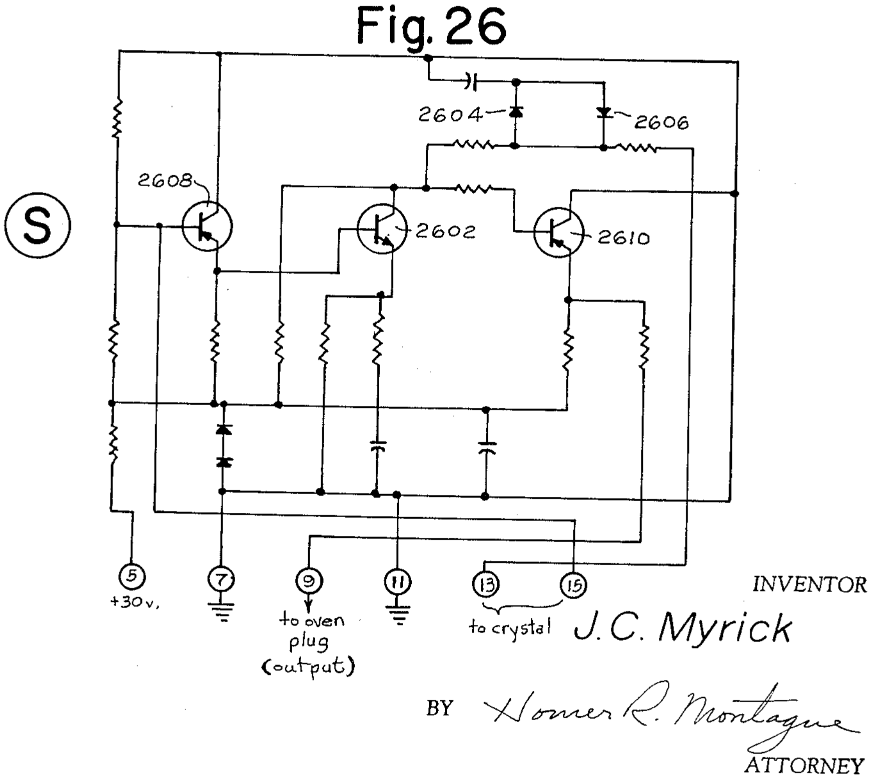
INVENTOR
J.C. Myrick
BY Homer R. Montague
ATTORNEY Nov. 6, 1962 J. C. MYRICK 3,062,913

HIGH SPEED SERIAL BINARY COMMUNICATION SYSTEM FOR VOICE FREQUENCY CIRCUITS

Filed March 10, 1960 24 Sheets-Sheet 23

T

U

INVENTOR

J. C. Myrick

BY Homer R. Montague

ATTORNEY

Nov. 6, 1962 J. C. MYRICK 3,062,913

HIGH SPEED SERIAL BINARY COMMUNICATION SYSTEM FOR VOICE FREQUENCY CIRCUITS

Filed March 10, 1960

INVENTOR
J. C. Myrick

BY Homer R. Montague
ATTORNEY

United States Patent Office 3,062,913

Patented Nov. 6, 1962

3,062,913

HIGH SPEED SERIAL BINARY COMMUNICATION SYSTEM FOR VOICE FREQUENCY CIRCUITS

Joseph C. Myrick, Silver Spring, Md., assignor to Rixon Electronics, Inc., Silver Spring, Md., a corporation of Maryland

Filed Mar. 10, 1960, Ser. No. 14,095

8 Claims. (Cl. 178—2)

This invention is concerned with electrical communication systems, and in particular with systems in which information in the form of electrical signals is propagated over a channel in the form of successive bits, or transitions back and forth between two distinct electrical conditions of the channel. It is convenient to think of these bits as consisting of the mark-space or on-off transitions of telegraphy, but other forms of two-valued transitions are possible within the scope of the invention.

It is a principal object of the invention to provide a system of the above type in which the effective transmission speed of serial bit signals is greatly increased by overcoming the adverse effects of certain limitations in the transmission characteristics of any realizable channel; namely, phase and amplitude distortion of the transmitted signals. The accomplishment of this object permits, for example, reliable high speed digital communication overy very long voice-frequency lines of ordinary toll telephone quality, and without the complications of frequency multiplexing.

A further object of the invention is to provide a system for serial bit signal transmission utilizing single-sideband transmission, and which can be easily and accurately adjusted to secure a selected optimum transmission speed for greatest freedom from errors over a variety of signal channels of differing characteristics, or over a single specific channel whose characteristics may vary from time to time.

Still another object of the invention is to provide novel duplex (two-way) signal channel terminating equipment capable of providing the above-mentioned advantages, and which equipment also includes provision for a simple and direct testing and adjusting routine for the entire system.

Another object of the invention is to provide a physical realization of such terminal equipment, its components and internal circuitry, whose novel design features include the use of a minimum number of types of individual functional sub-units, a high degree of circuit simplicity considering the results achieved, ease of circuit and component testing and replacement, minimum power requirements and heat dissipation, and very high dependability.

An additional object is to provide terminal equipment of the above type including built-in provision for alternative voice modulation transmissions over the same channel, for example for use as an order wire or the like.

Yet another object of the invention is to provide terminal equipment of the type indicated which is constructed as a single self-contained unit, in combination with a novel checking and servicing template which physically designates significant test points of the terminal equipment, provides test prod isolation for such points or terminals, and provides check or test data or wave-form information for the guidance of those servicing the equipment.

More specifically, the invention accomplishes the above aims by providing duplicate duplex terminal equipments for connection to existing two-wire or four-wire physical channels, or their wireless counterparts; each such terminal equipment including (1) binary signal input amplitude limiter and shaping filter means, (2) a fixed voice-frequency oscillator to serve as the carrier source establishing the upper frequency limit of the system for signals propagated in one direction over the channel, (3) a balanced modulator for eliminating the modulating signal components as such, and (4) a single-sideband transmission filter and amplifier apparatus so designed as to apply voice-frequency signals of one sideband only to the channel for one direction of propagation; these components forming the transmitter section of the equipment. Each equipment also includes a receiver section comprising (5) bandpass filter, amplifier and AGC means for amplifying and shaping incoming signals from the channel, (6) equalizing means for adjusting the relative phase delay of signal components which have been differentially delayed in transmission, to compensate for variations in the phase and frequency characteristics of the channel, (7) detector and low-pass filter means for recovering the original modulation signal envelope, (8) means for squaring up and amplifying the recovered signals, and (9) synchronous sampling means automatically controlled at the repetition rate of the received signals for reconstituting an accurate D.C. replica of the control pulses applied to the opposite terminal equipment. Finally, each equipment includes built-in adjustment, testing and channel calibration devices including a portion of the components already described, together with a random keying source for preliminary or periodic measurements or indication of the channel characteristics and equipment operation.

As applied to the transmission of serial binary information over ordinary long-line voice communication circuits, the novel system permits accurate high-speed transmission of signals in a form best adapted to full utilization of the limited bandwidth capabilities of such circuits, and enables the complete recovery of all the significant information, including the zero frequency (direct current) components thereof, impressed on the other end of such circuit.

The manner in which the present invention accomplishes the above and other objects of the invention will best be understood from a study of the following detailed specification of a complete system and apparatus forming a preferred embodiment of the invention, reference also being made to the appended drawings, in which.

Figures 5, 6:
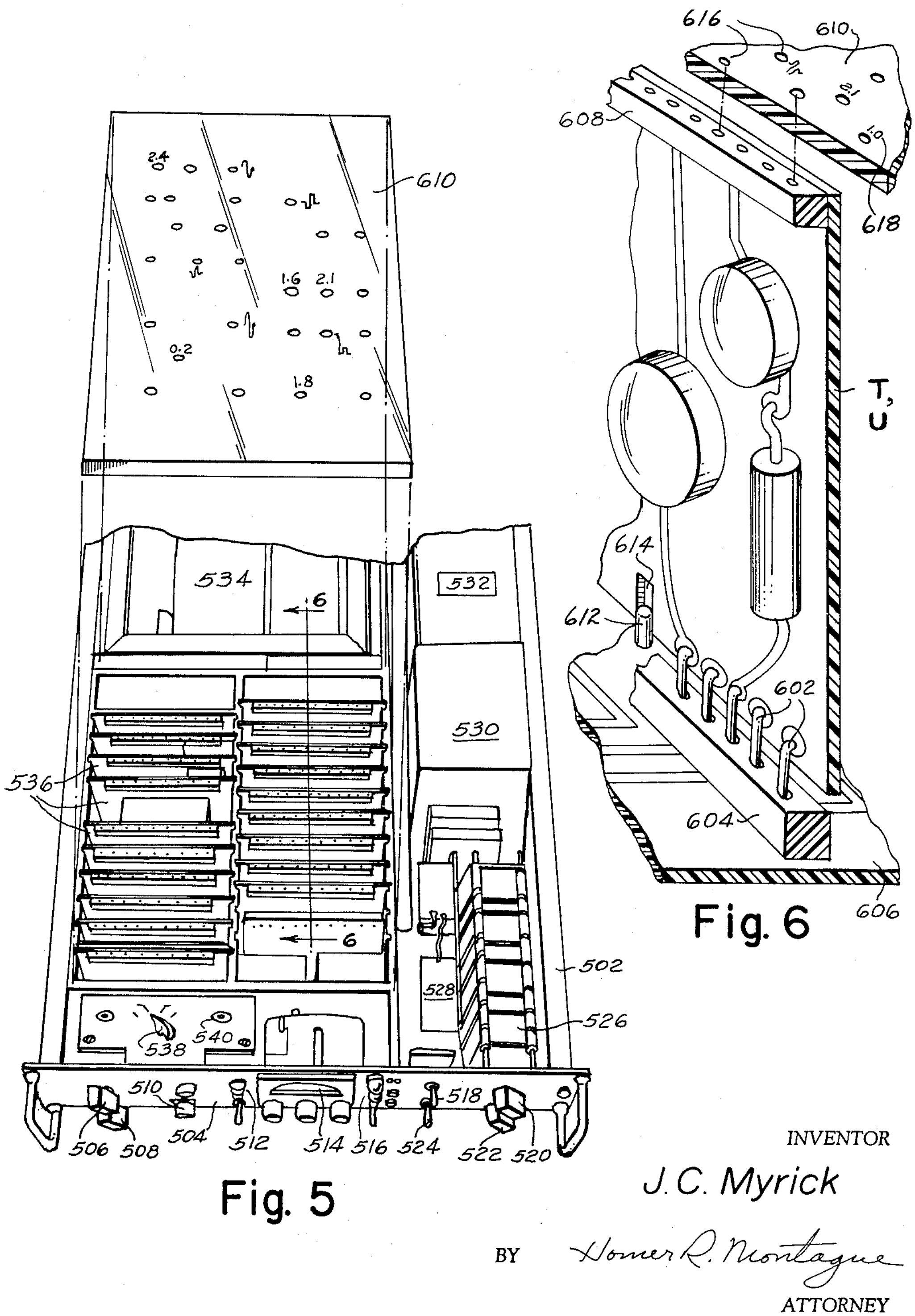
FIGURE 5 is a perspective view of a complete terminal equipment incorporating all of the features of the invention, as organized in the form of a single piece of rack-mountable apparatus.
FIGURE 6 is a vertical sectional view, taken approximately on the line 6—6 of FIGURE 5, showing the arrangement of a single printed circuit module typical of those included in the equipment, with its connections and test facilities.

FIGURE 7–A and FIGURE 7–B together illustrate the complete assembly schematic of the equipment of FIGURE 5, with the individual receptor jacks for the printed circuit modules shown in their proper physical relationship and illustrating also the components of the equipment which cooperate with such modules; these two figures can be fitted together along their common division line.

Figure 8:
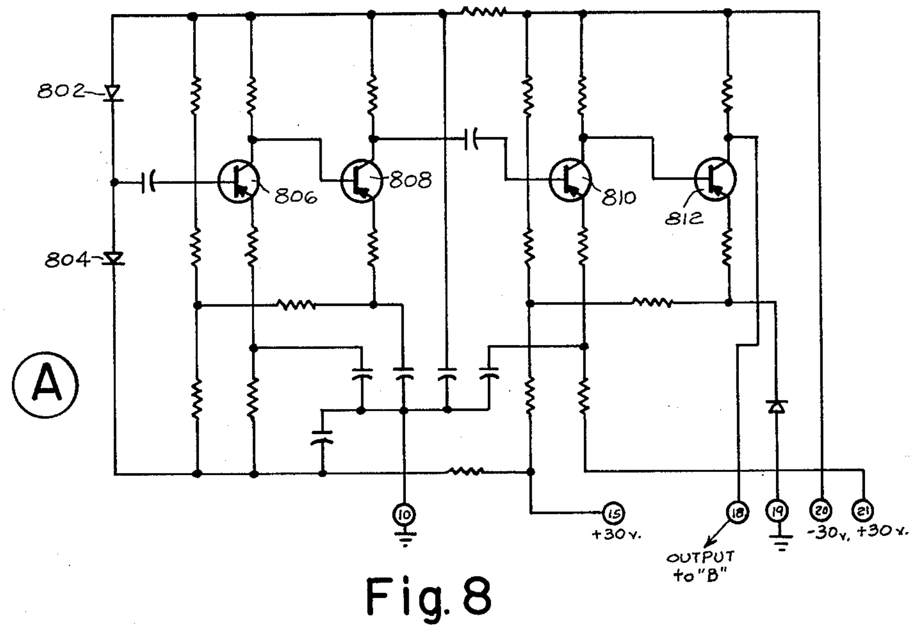

FIGURE 8 is the schematic diagram for the printed circuit module constituting a part of the random bit generator of the equipment, hereinafter referred to for brevity as "card A."

Figure 9:
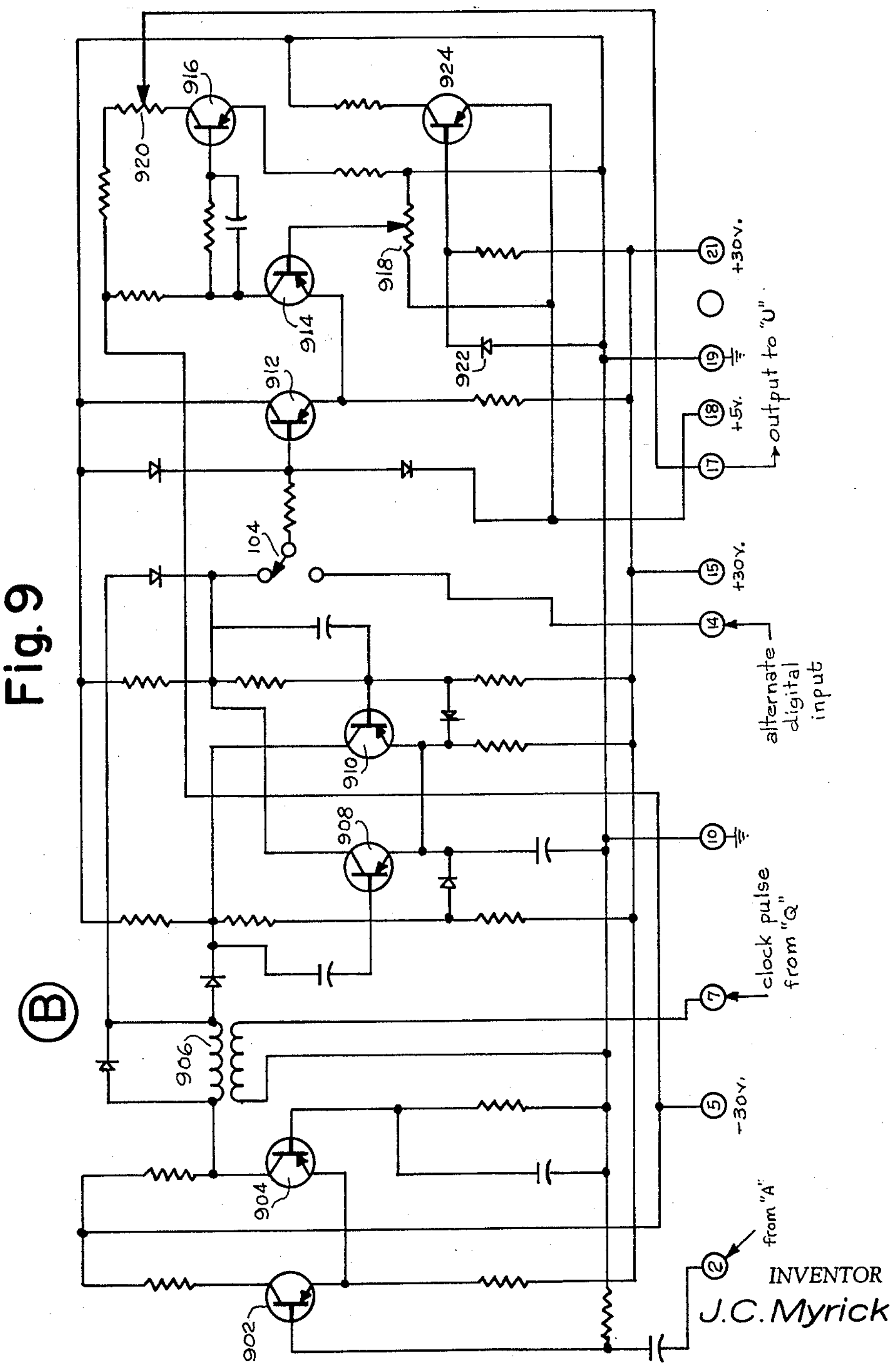

FIGURE 9 is the schematic diagram for the printed circuit module constituting the remainder of the random bit generator and limiter therefor, hereinafter referred to for brevity as "card B."

Figure 10:
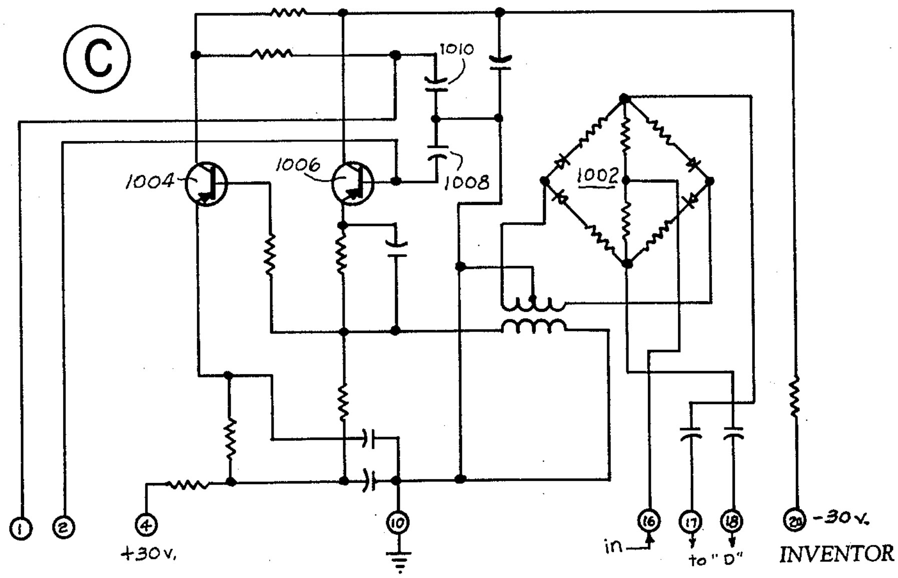

FIGURE 10 is the schematic diagram for the printed circuit module constituting the carrier frequency oscillator and modulator of the equipment, hereinafter referred to for brevity as "card C."

Figure 11:
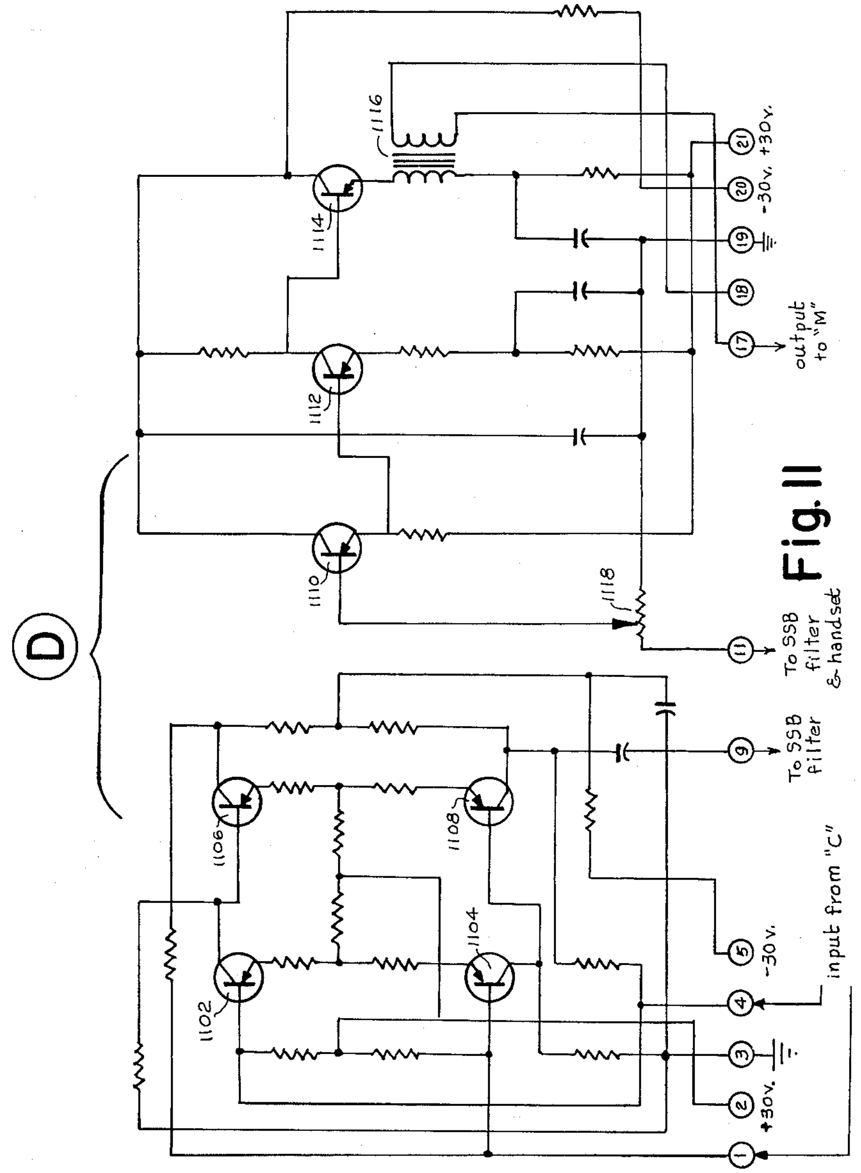

FIGURE 11 is the schematic diagram for the printed circuit module constituting the transmitter and line amplifier of the equipment, hereinafter referred to for brevity as "card D."

Figure 12:
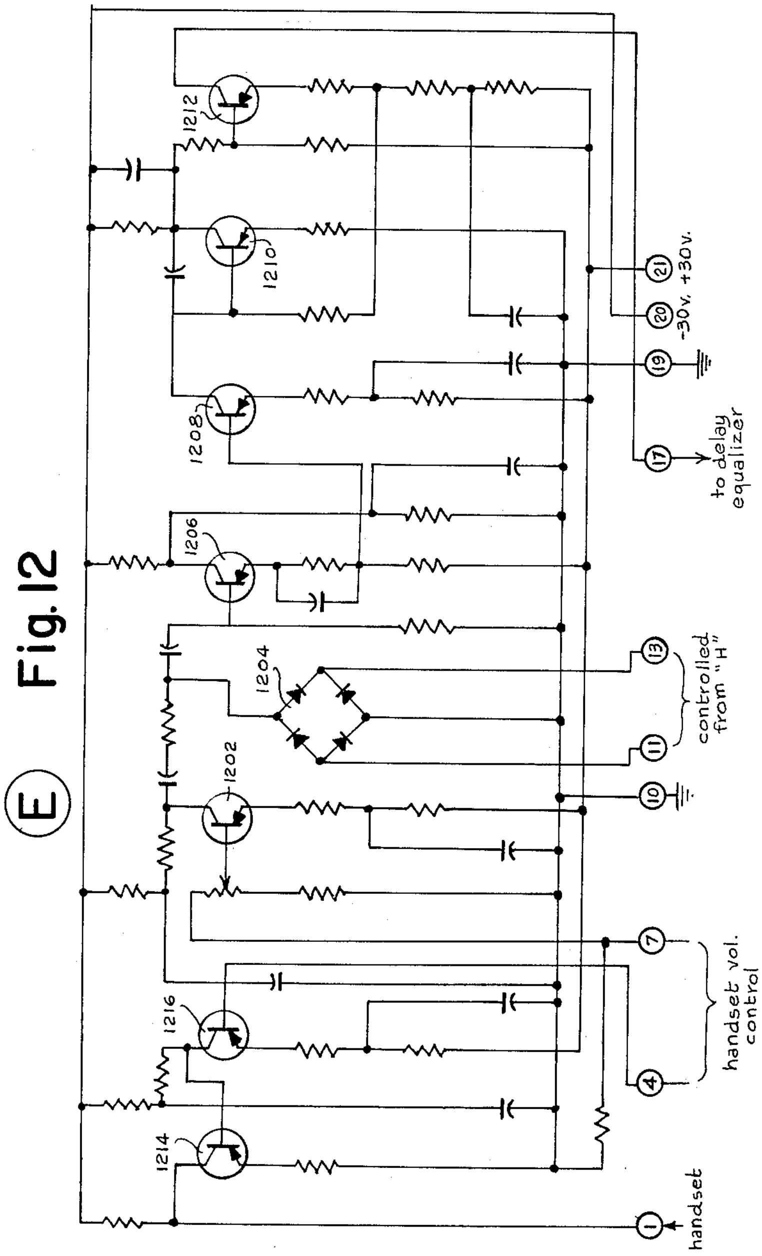

FIGURE 12 is the schematic diagram for the printed circuit module constituting the receiver preamplifier and varilosser portion of the equipment, hereinafter referred to for brevity as "card E."

Figure 13:
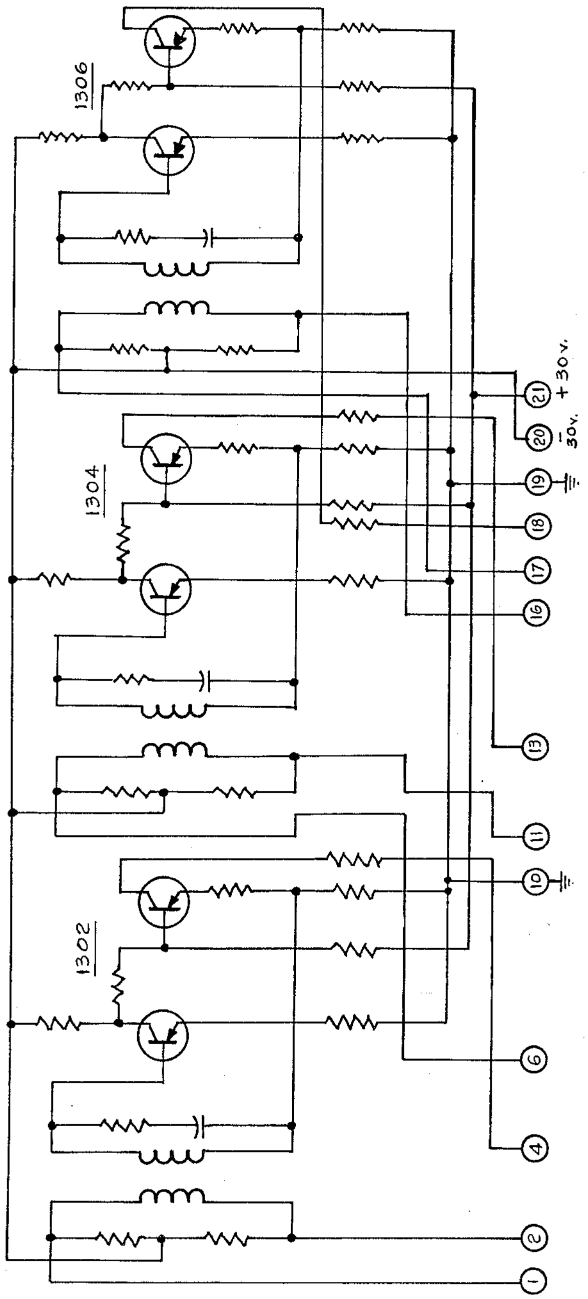

FIGURE 13 is the schematic diagram for the printed circuit module constituting the received-signal delay equalizer amplifier of the equipment, hereinafter referred to for brevity as "card F."

Figure 14:
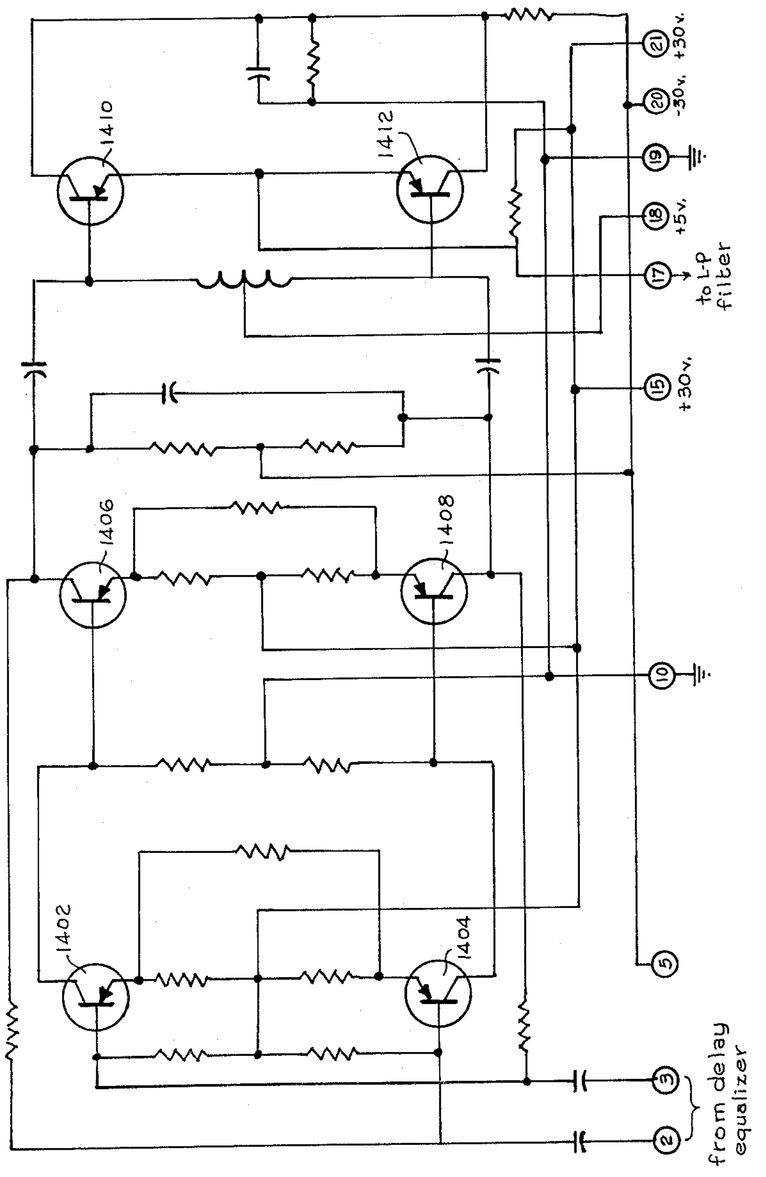

FIGURE 14 is the schematic diagram for the printed circuit module constituting the receiver amplifier and detector driven from card F of the equipment, hereinafter referred to for brevity as "card G."

Figure 15:
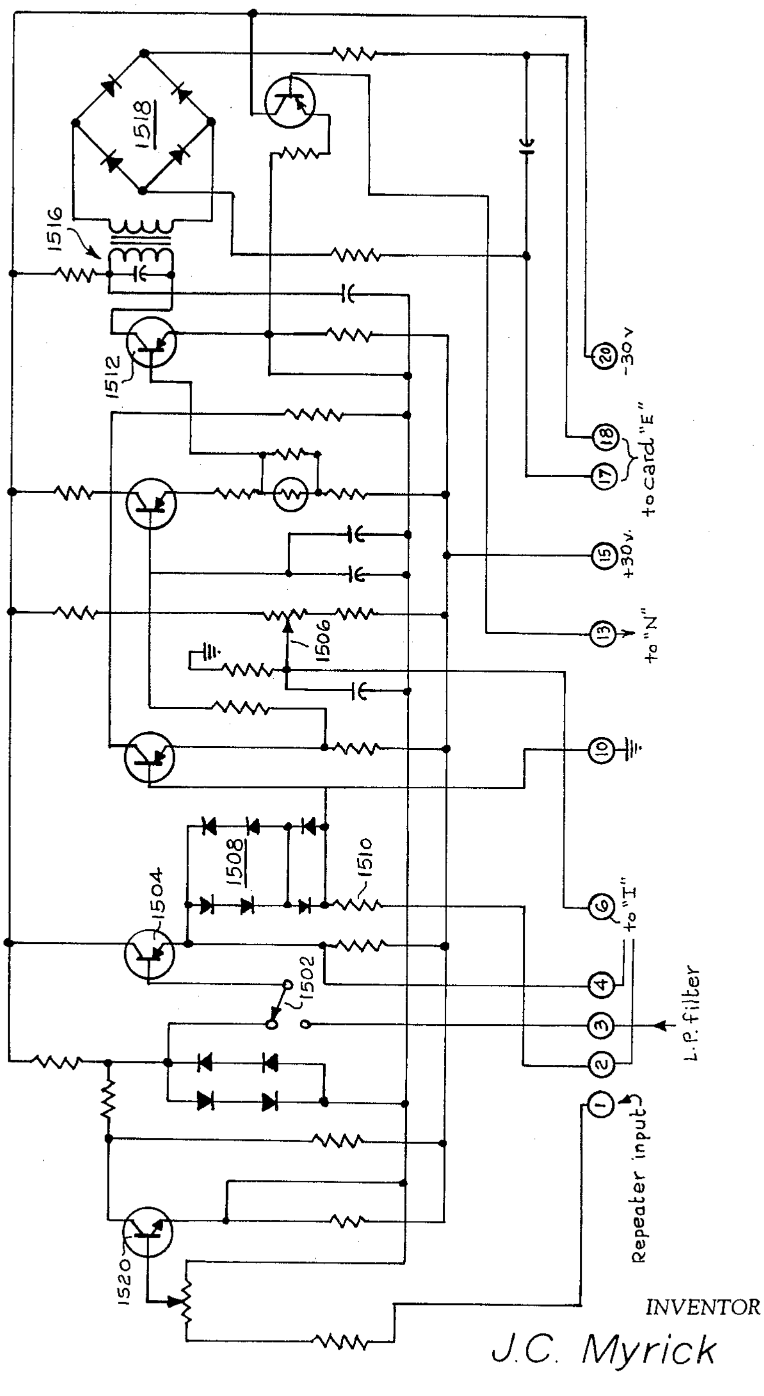

FIGURE 15 is the schematic diagram for the printed circuit module constituting the receiver automatic gain control (AGC) amplifier of the equipment, hereinafter referred to for brevity as "card H."

Figure 16:
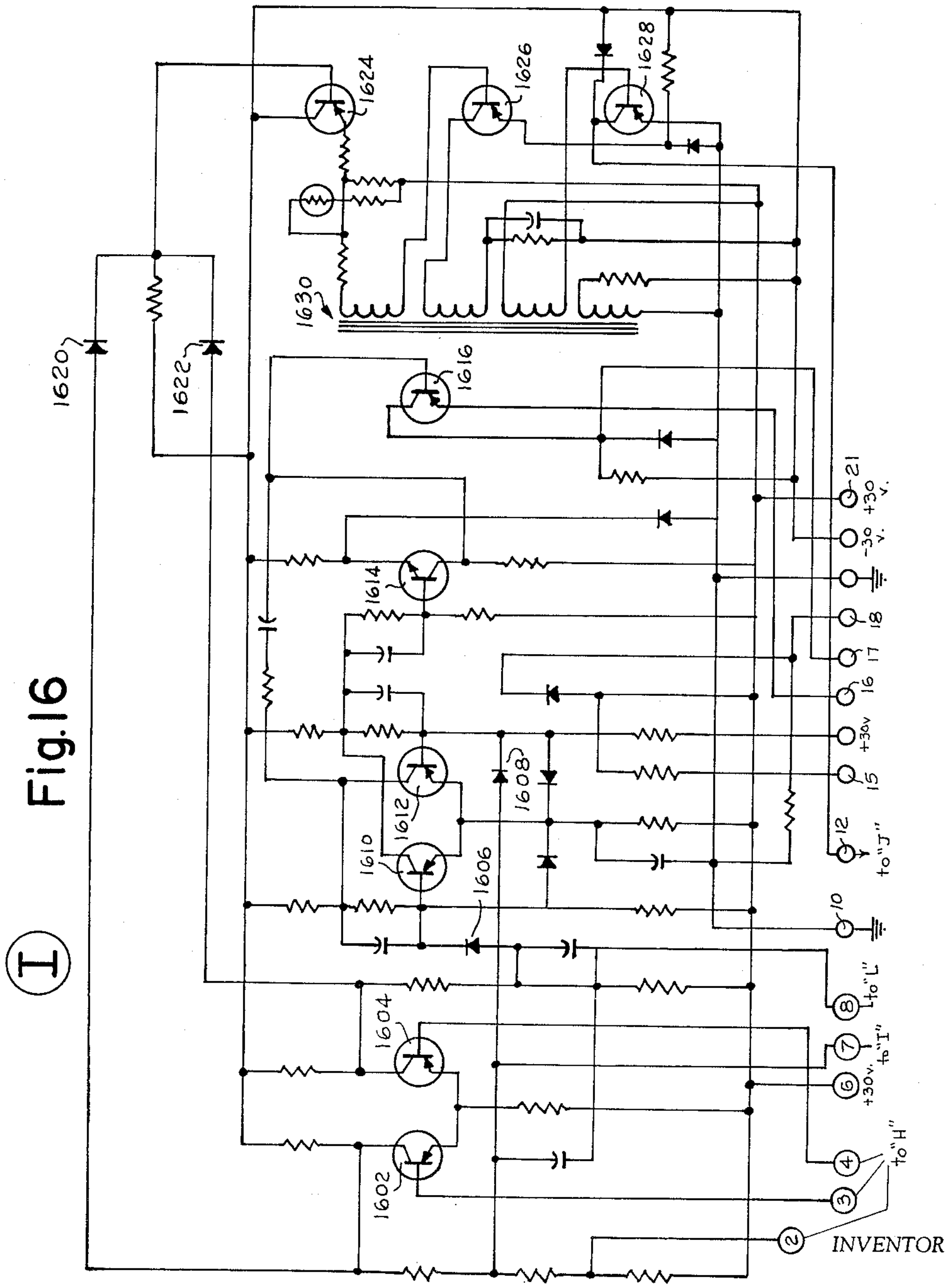

FIGURE 16 is the schematic diagram for the printed circuit module constituting the receiver power output amplifier and polarity reversal detector of the equipment, hereinafter referred to for brevity as "card I."

Figure 17:
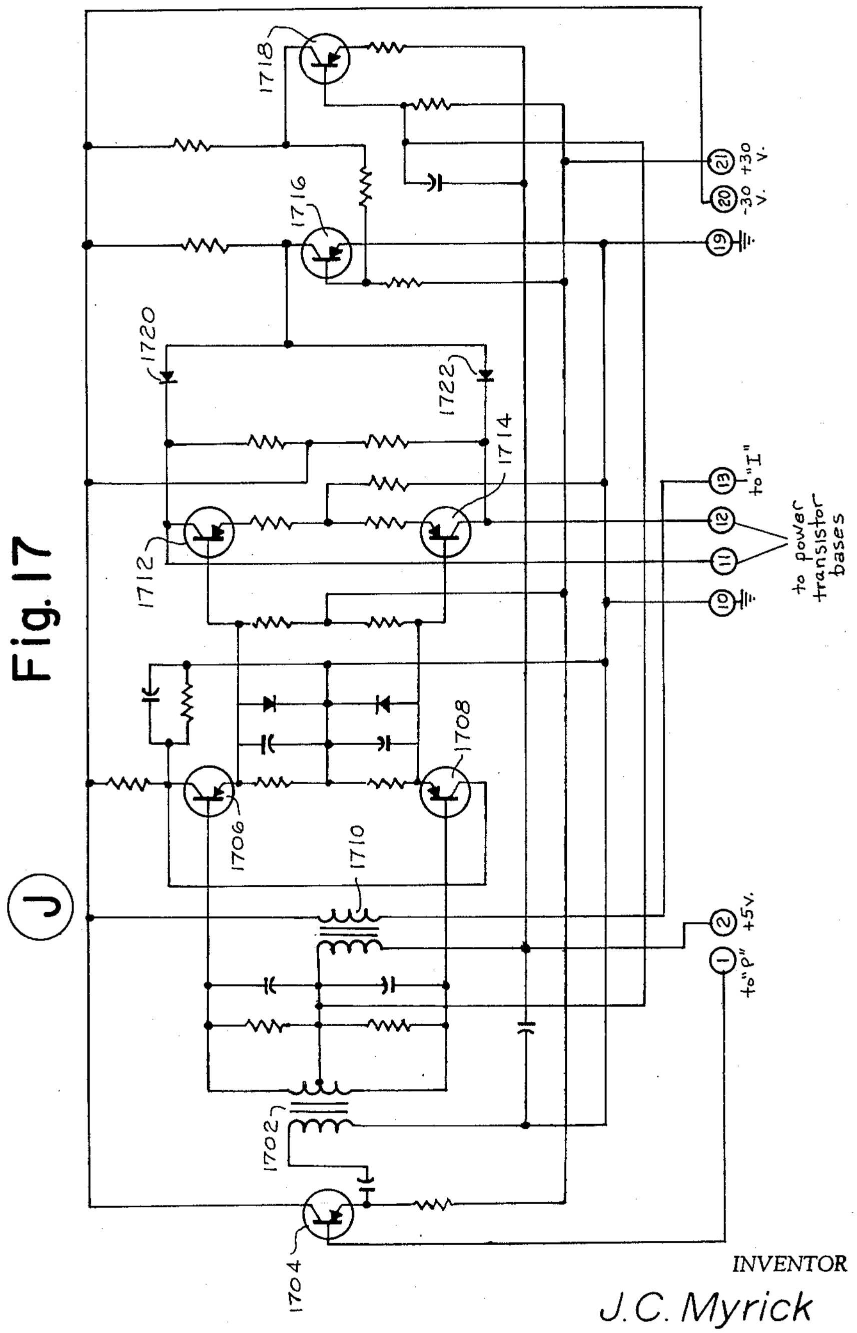

FIGURE 17 is the schematic diagram for the printed circuit module constituting the synchronism error detector and correcting-motor control amplifier of the equipment, hereinafter referred to for brevity as "card J."

Figure 18:
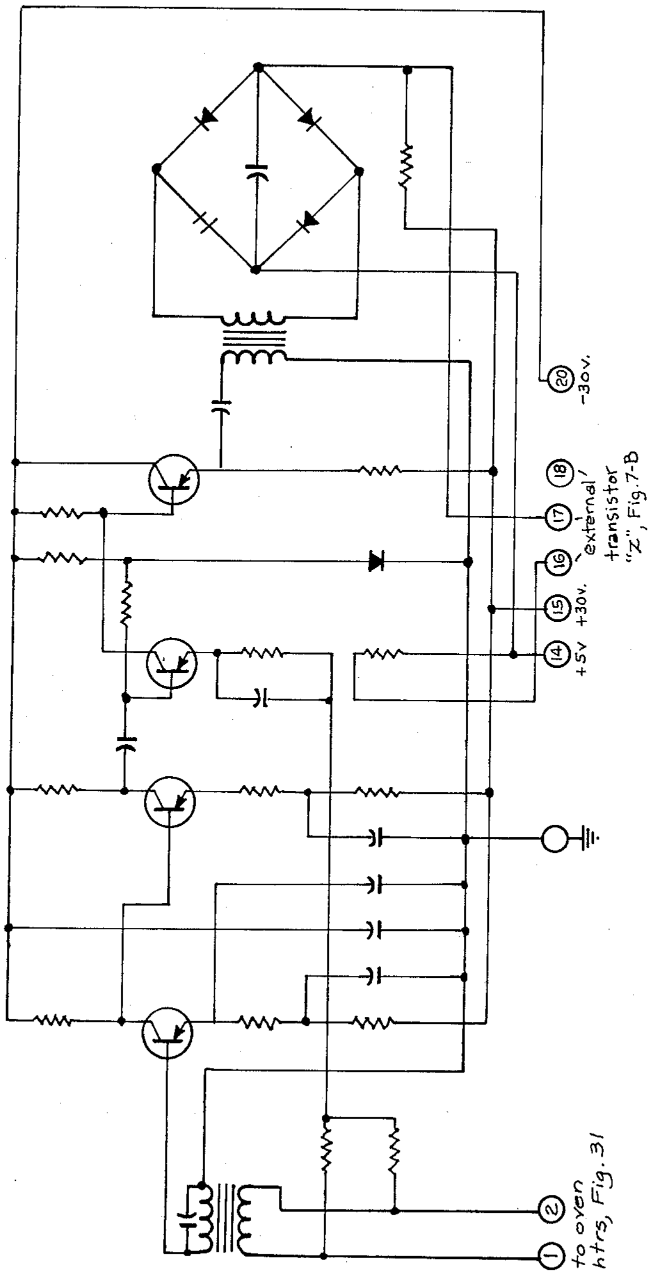

FIGURE 18 is the schematic diagram for the printed circuit module constituting the crystal over control of the equipment, hereinafter referred to for brevity as "card K."

Figure 19:
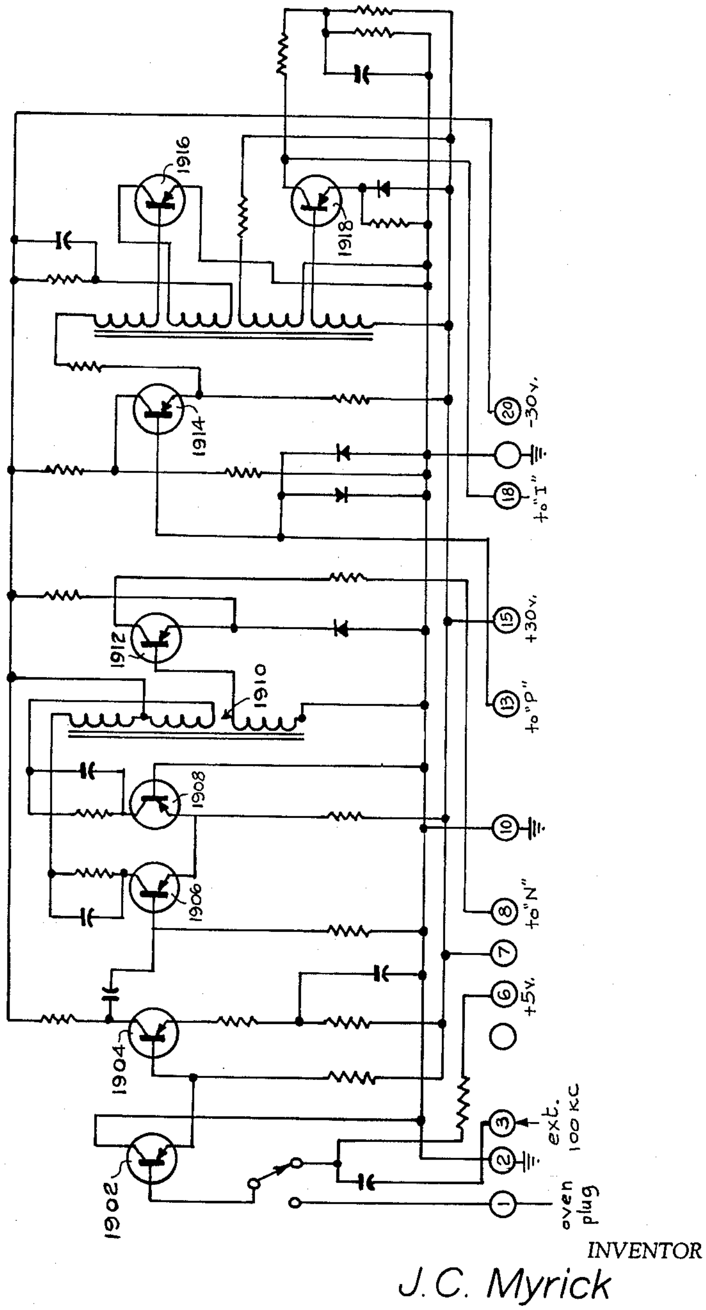

FIGURE 19 is the schematic diagram for the printed circuit module constituting the 100 kc. crystal-controlled amplifier and pulse generator of the equipment, hereinafter referred to for brevity as "card L."

Figure 20:
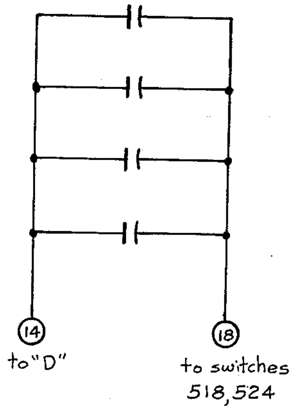

FIGURE 20 is the schematic diagram for a printed circuit module constituting a group of line amplifier capacitors forming a part of the equipment, hereinafter referred to for brevity as "card M."

Figure 21:
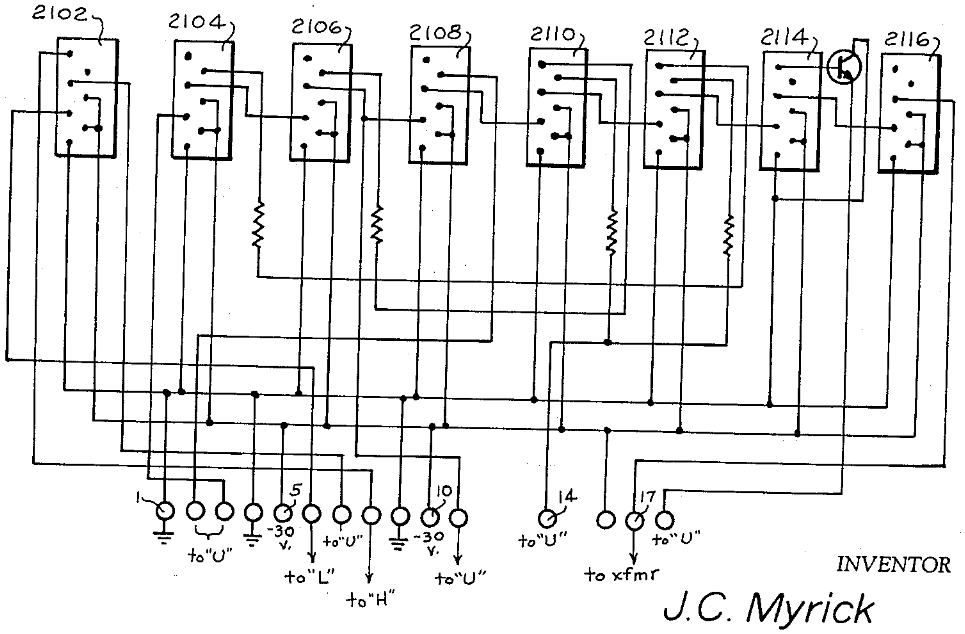

FIGURE 21 is the schematic diagram for the printed circuit module constituting the frequency-divider of the equipment, hereinafter referred to for brevity as "card N."

Figure 22:
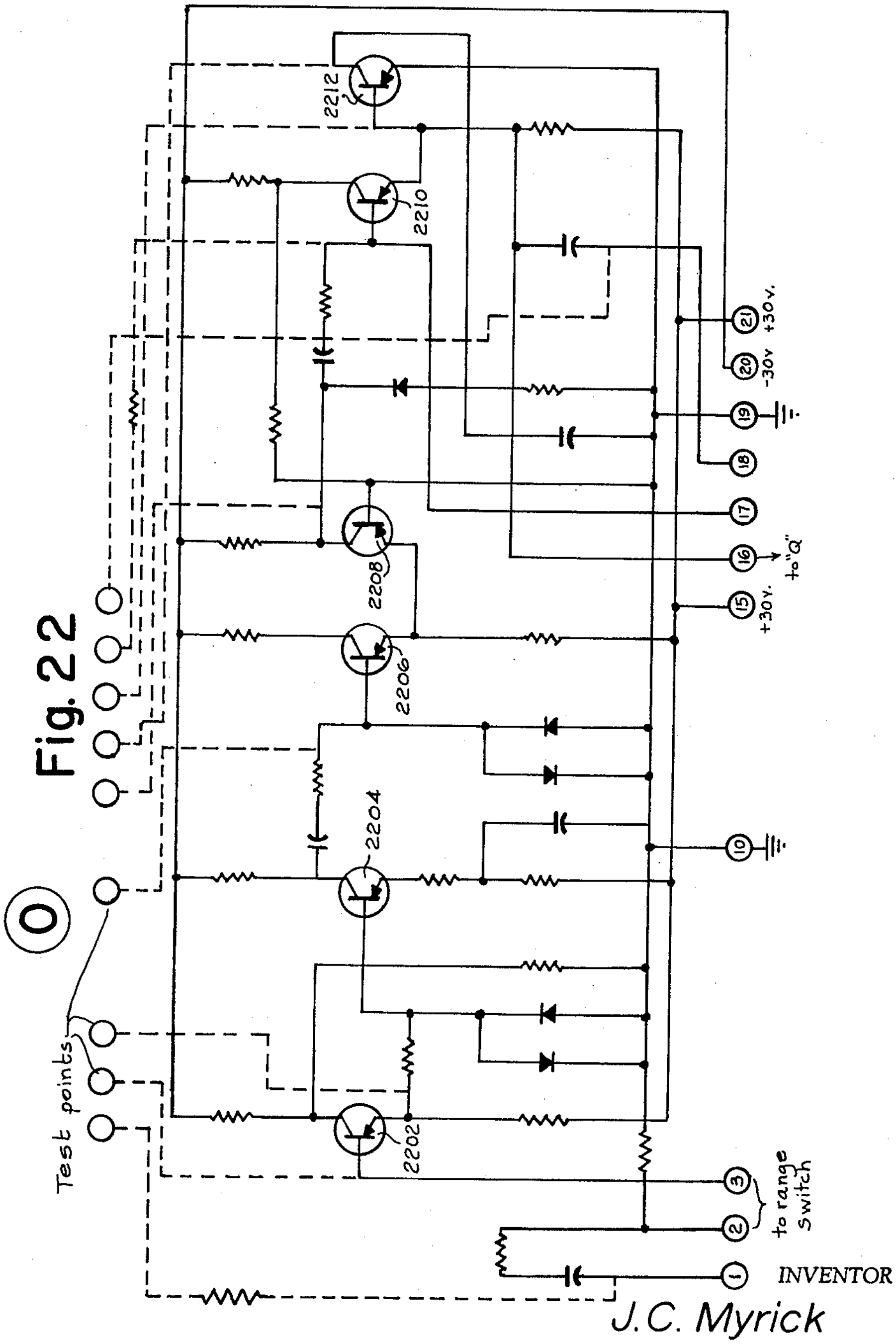

FIGURE 22 is the schematic diagram for the printed circuit module constituting the timing circuit of the equipment, hereinafter referred to for brevity as "card O."

Figure 23:
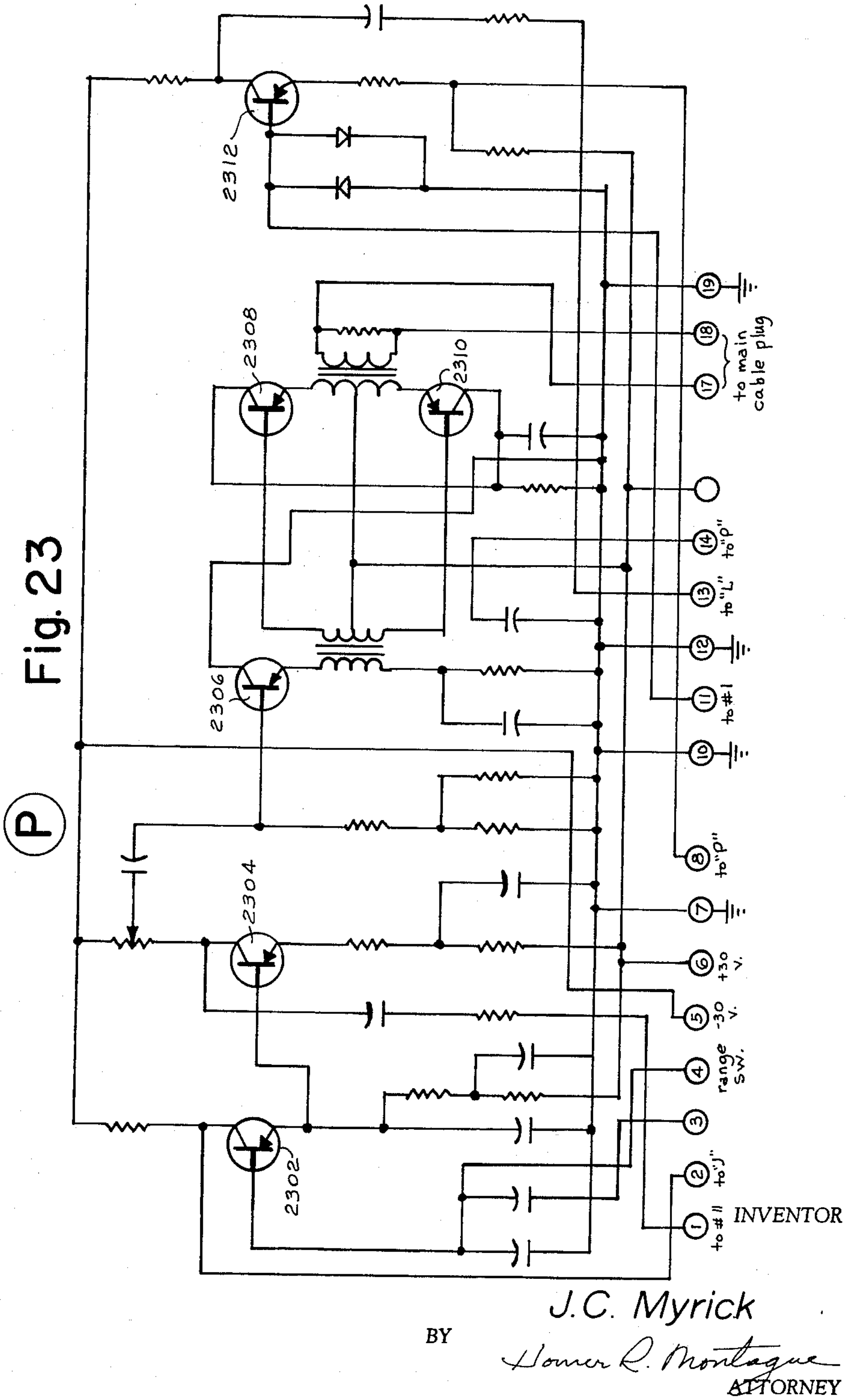

FIGURE 23 is the schematic diagram for the printed circuit module constituting the resolver for the timing circuit of the equipment, hereinafter referred to for brevity as "card P."

Figure 24:
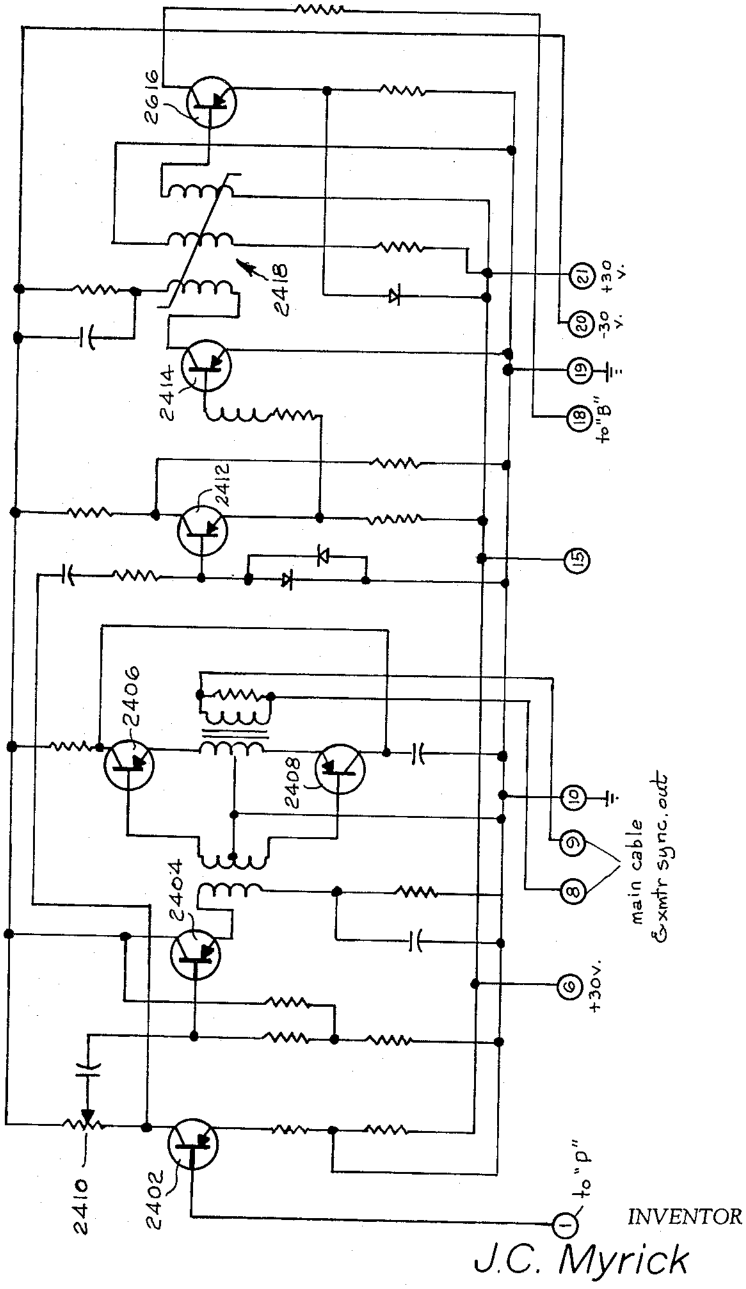

FIGURE 24 is the schematic diagram for the printed circuit module constituting a synchronizing circuit for the equipment, hereinafter referred to for brevity as "card Q."

FIGURE 25 is the schematic diagram for the printed circut module constituting the H-pad and line transformer of the equipment, hereinafter referred to for brevity as "card R."

FIGURE 26 is the schematic diagram for the printed circuit module constituting the 100 kc. crystal-controlled oscillator of the equipment, hereinafter referred to for brevity as "card S."

Figure 27:
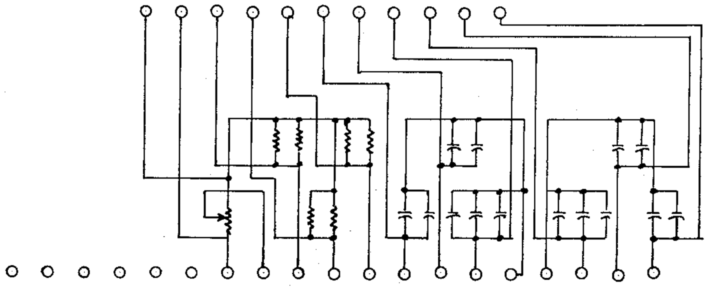

FIGURE 27 is the schematic diagram for the printed circuit module which, together with a second module secured thereto, constitutes a bit-rate switching device for the equipment; being selectively insertable in any of three module-receiving positions of the chassis. This module is hereinafter referred to for brevity as "card T."

Figure 28:
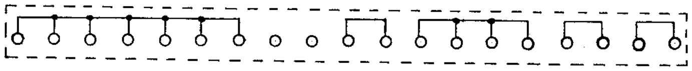

FIGURE 28 is the schematic diagram for the other module mentioned in connection with FIGURE 27, and is hereinafter referred to for brevity as "card U."

Figure 29:
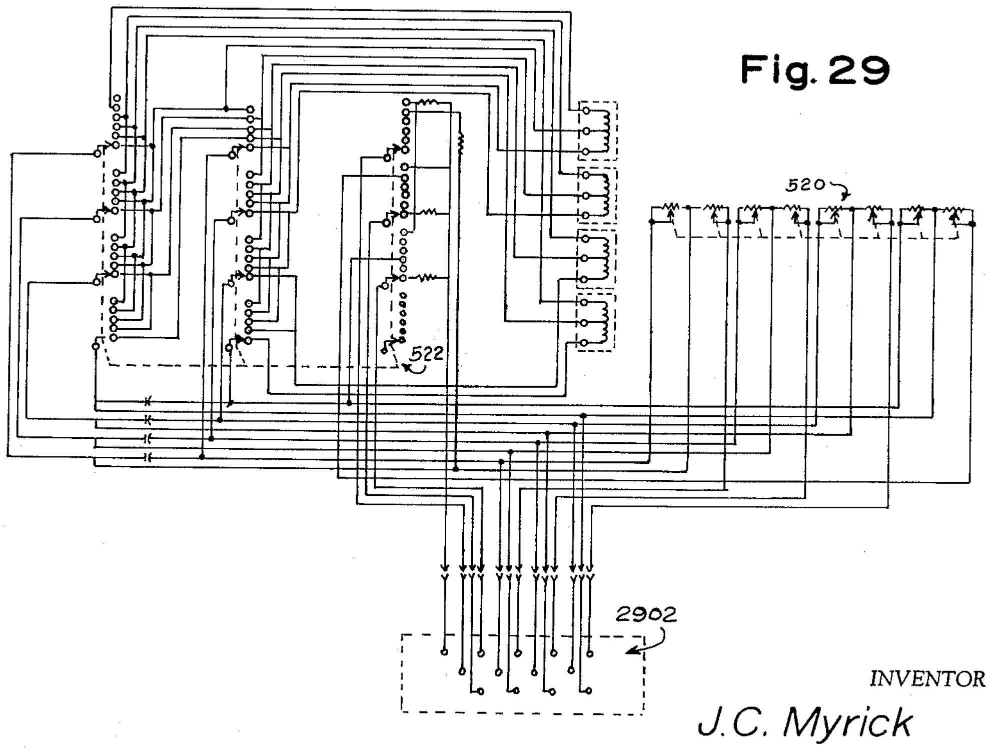

FIGURE 29 is the schematic diagram for the manually adjustable step delay equalizer selector of the equipment.

Figure 30:
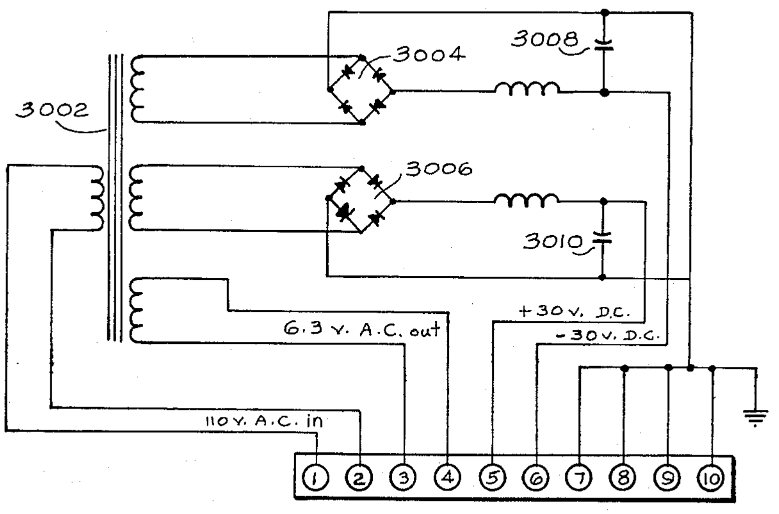

FIGURE 30 is the schematic diagram of the main power supply of the equipment, furnishing required operating voltages from ordinary mains.

Figure 31:
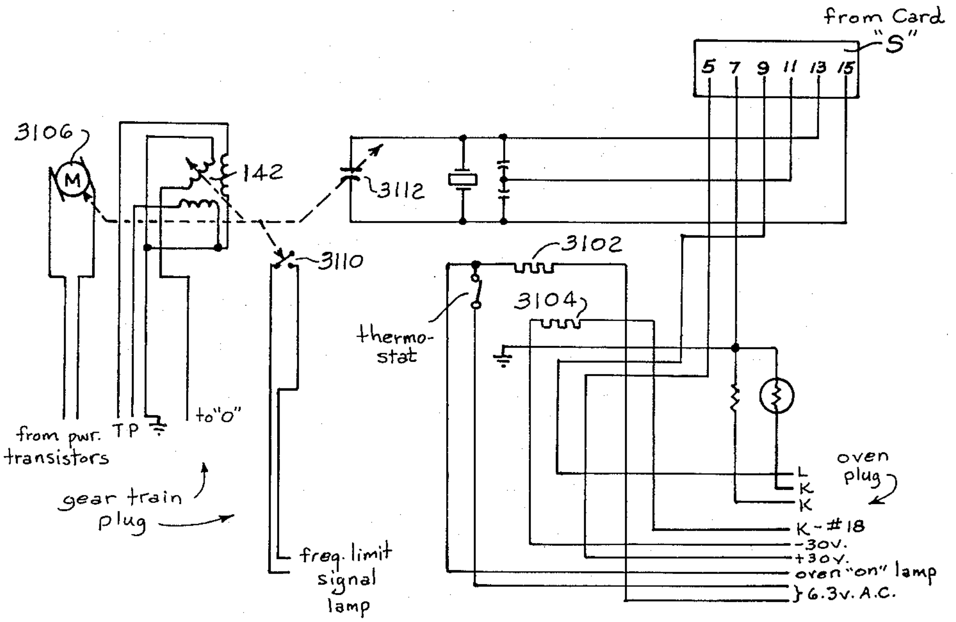

FIGURE 31 is a schematic diagram of the motor, resolver, gear train and oven wiring related to the automatic synchronizing portion of the equipment.

INTRODUCTION

The transmission of digital data over voice communication circuits is an important aspect of many modern electronic systems. Electronic computers, automatic data processing equipment, high speed teleprinter circuits, and many other devices must frequently be interconnected over existing communication facilities. Unfortunately, the characteristics of the usual voice communication circuits are not suitable for the direct transmission of such digital information. Thus, for example, the steady-state or D.C. level is an important component of digital information, and provision has to be made for the transmission of frequency components down to and including zero frequency, which is beyond the frequency capability of the ordinary voice communication circuits.

The duration of the shortest element of the digital information determines the highest frequency that has to be transmitted; a commonly used rule-of-thumb is that the transmission system must be able to pass frequency components up to 0.75 times the frequency corresponding to the reciprocal of the time duration of the shortest bit, measured in seconds. For example, if the shortest element is 1 millisecond, the transmission system must have an upper cut-off frequency of at least 750 cycles per second. In addition, the system must have a reasonable linear time-delay versus frequency characteristic from zero frequency to this upper cut-off, to prevent serious overshoot and other damaging forms of distortion.

Since voice frequency channels seldom pass frequencies below a few hundred cycles per second, it is the usual practice to employ a carrier signal that is modulated in either an AM, FM or PM fashion by the digital information to be transmitted. The unmodulated carrier can thus provide the steady-state or D.C. level. Since the modulation process generates sidebands that are symmetrically displaced around the carrier frequency, the resultant signal spectrum is at least twice as wide as it would be if the D.C. component could be transmitted directly.

For relatively slow speed signalling systems, such as 60 word-per-minute teletypewriter signals, bandwidth has not been a serious handicap. In this instance, the shortest signalling element is of the order of 0.02 second, corresponding to a bandwidth requirement of 75 to 150 cycles per second, depending on the type of modulation employed. It has been common practice to employ ten or more carrier frequencies dispersed in the 300 to 3,000 cycle per second spectrum to provide simultaneous transmission of several teletypewriter channels over a single voice communication circuit or channel. Utilizing modern techniques, as many as 40 such teletypewriter channels can be so accommodated over a high quality voice channel, giving an over-all information rate of the order of 2,000 bits per second. However, this can only be done at the cost of very elaborate, and expensive, apparatus which is able to break down the original time-sequential information into multichannel frequency information, and to reconstruct it at the opposite terminal.

The present invention provides equipment of relatively very simple form for the transmission of high speed digital (binary) information over existing voice channels of the type considered above, by a combination of vestigial sideband carrier transmission, using a single carrier located near one end of the reliable spectrum of the circuit, with adequate correction for the vagaries of the time-delay characteristics of the circuit, and with automatic synchronization of the receiving equipment to provide signal-state sampling at those intervals in the time-serial signals at which a correct indication of the polarity state can most reliably be obtained. In terms of the circuits considered above, extremely reliable transmission over ordinary voice channels can be obtained at bit-rates up to 2,500 per second, and over circuit lengths of thousands of miles, equipped with the usual complement of switching centers, repeaters, carrier equipment and other possible sources of line-condition variation.

CIRCUIT CHARACTERISTIC CONSIDERATIONS

Figure 3:
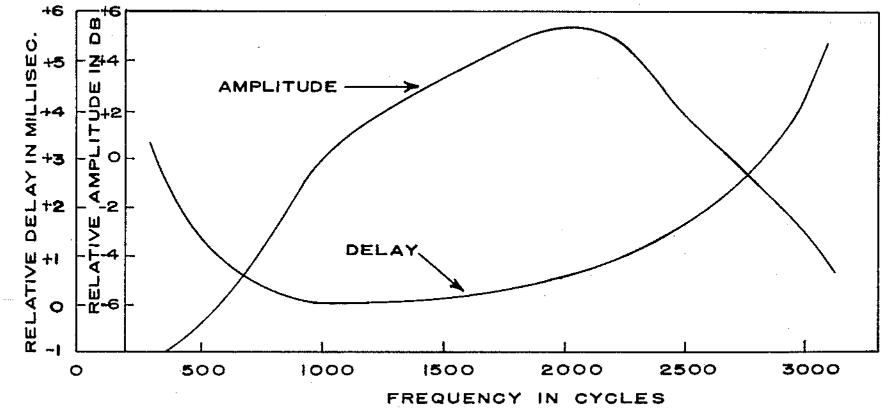
FIGURE 3 is a graphical illustration of the amplitude and delay characteristics of a typical wire line circuit of substantial length, and over which the inventive system operates with conspicuous success.

For voice purposes, ordinary 300–3,000 cycle circuits are perfectly adequate, as the human ear can tolerate a considerable non-uniformity in both amplitude and transmission-time characteristics without loss of comprehension of the spoken words. This tolerance is especially wide as to time-delay properties, whence it happens that the amplitude characteristic has been the prime consideration of those designing voice circuits; the anomalies of time delay, most often introduced by lumped constant networks such as filters or loading coils, are most severe near the ends of the voice band, where some intentional attenuation is introduced by the circuit designers. FIGURE 3 shows graphically the amplitude and frequency non-linearities of a typical voice circuit of commercial quality.

Figure 2:
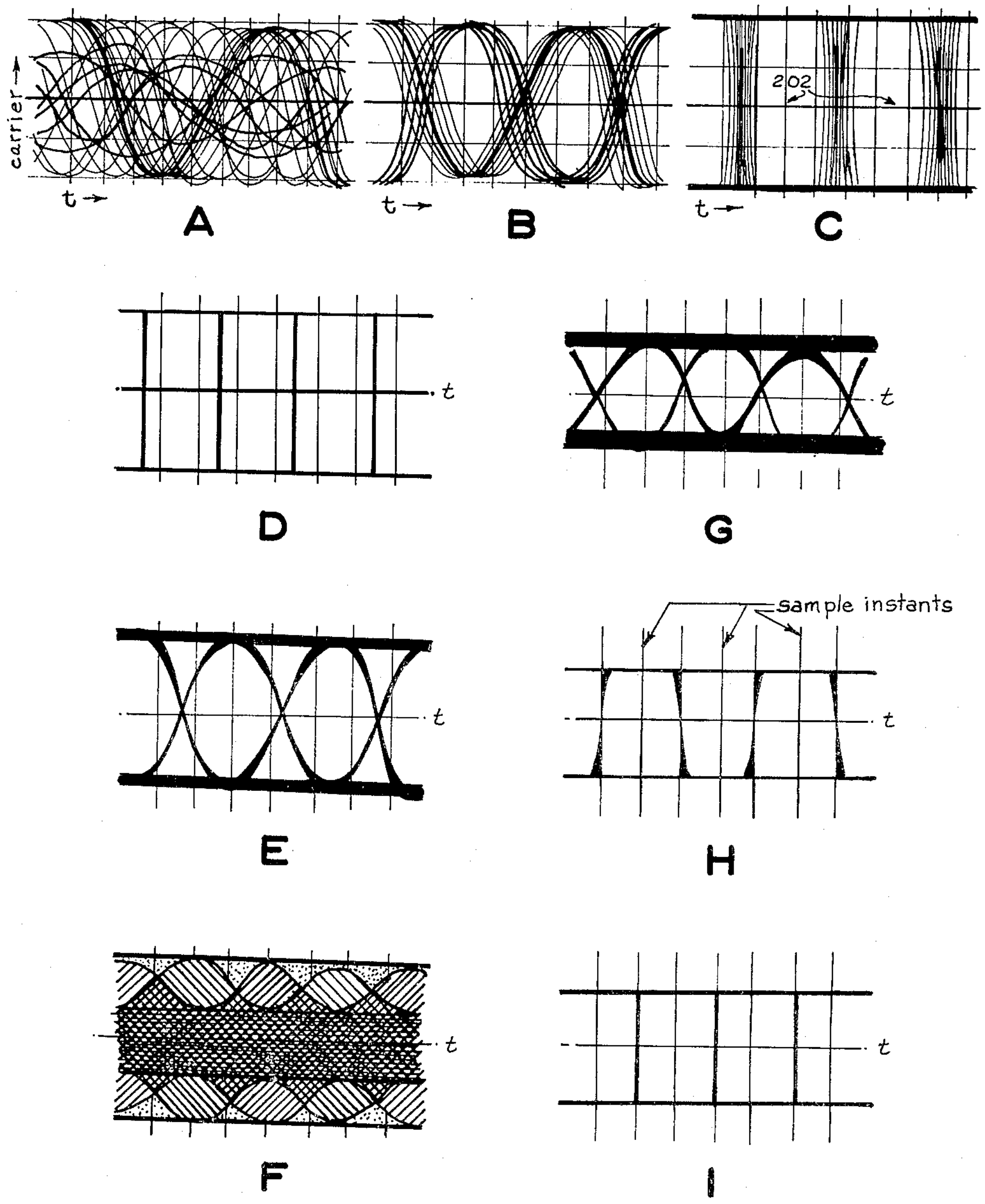
FIGURES 2A–2I are a set of graphs, reproduced from actual oscilloscope patterns, illustrating the nature of the signals processed at various stages in the system.

In the case of vestigial sideband transmission, the delay distortion at the low-frequency end of the voice band is of the little concern, because the carrier is located near or at the upper edge of this band. Since the low-frequency components of the modulating intelligence lie close to the carrier, they are delayed so much that they no longer have the correct relationship to the higher frequency components, producing a scramble such as illustrated in FIGURE 2 (A). The high frequencies, which are the result of the 1–0–1–0 (mark-space) transitions, are readily distinguishable, but the mis-phased low frequency components (e. g., 1–1–1–0–0–0) produce a wide variation in the vertical positions of successive high frequency cycles. The present system utilizes amplitude limiting and time-delay correction across the spectrum, chosen in accordance with existing circuit conditions, to provide equalization as illustrated in FIGURE 2 (B), in which the lower limit of the oscilloscope pattern corresponds to the modulation trough or minimum carrier level, while the upper limit corresponds to the peak carrier level. The effect of phase modulation introduced by vestigial sideband operation is clearly evidenced. In all these diagrams, the signal is shown as random mark-space keying exhibited on a scope whose sweep is set to display an integral number of (several) bits across the time scale, which accounts for the appearance of superposition.

Compensation of the differential time delay as between low and high frequencies is provided by the invention, amounting to a shift of the times of the low frequency components to their original (undelayed) positions, or, what amounts to the same thing, a shift of the high frequency components to the time position of the lows. By providing a small number of equalization steps, the invention makes the scope pattern of FIGURE 2 (C) readily feasible, in which the transition times are readily distinguishable, particularly if the polarity-change sensing is performed (again according to the invention) at times corresponding to approximately the midpoints between actual transitions as indicated at 202 in FIGURE 2 (C).

GENERAL DESCRIPTION—BLOCK DIAGRAM

*Transmitter*

The theory of operation of the invention will now be described, in connection with the block diagram (FIGURE 1) of the entire system, reference also being made to the oscilloscope displays of FIGURE 2 for illustration of the effects produced at various stages in transmission and reception.

Figure 1:
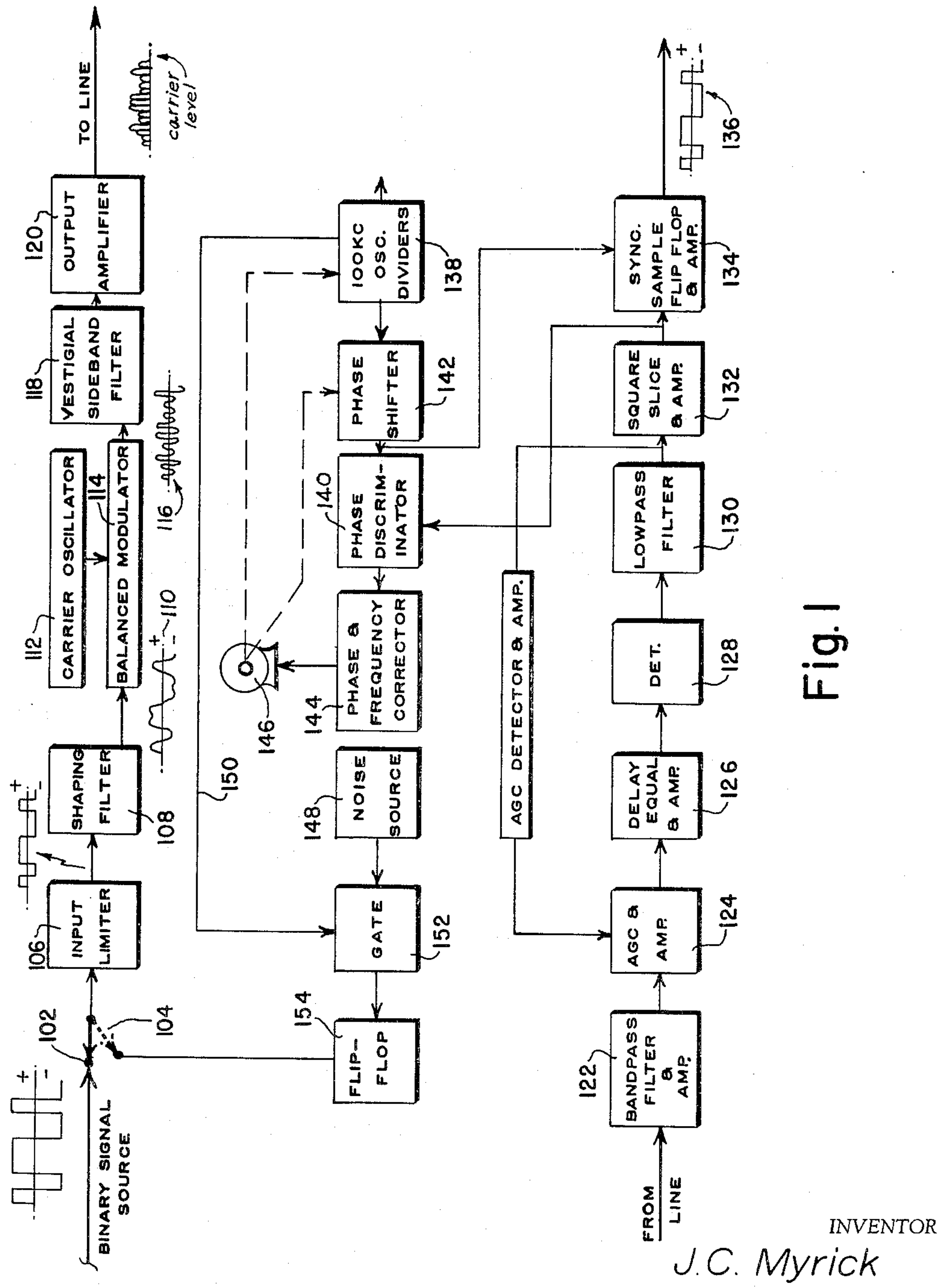
FIGURE 1 is a block diagram illustrating the major components of a system under the invention, and showing their functional relationships.

Referring now to FIGURE 1, the six blocks across the top of the diagram illustrate the transmitter section, binary input information from a teleprinter, distributor or like source being received at terminal 102 and passed over switch 104 to an input limiter 106 operating automatically to adjust the input level to that desired for the equipment as designed. The time function representation of a typical series of bits is represented by sample waveforms at various points in the diagram, and it will be apparent that if the signal output of limiter 106 had to be transmitted, for a 2,500 per second bit rate and with a carrier frequency of 2,500 cycles per second, a bandwidth of at least 25 kc. would be needed; the signal input scope pattern is shown in FIGURE 2 (D). The signal is therefore passed through the shaping filter 108 whose rise time is such that the signal reaches 95% of its final amplitude within the time of one bit following a transition, producing the waveform as illustrated at 110, and scope pattern of FIGURE 2 (E), whose bandwidth requirement is not more than one-half that just stated, or about 2,500 cycles, and readily capable of transmission over a 300–3,000 cycle voice circuit assuming that adequate delay compensation can be provided. Note that the time information of the original signal is still conveyed by the axis-crossing interval, and that the sense is indicated by the polarity.

The signal indicated at 110 is then employed to modulate a 2,500 cycle carrier, supplied by carrier oscillator 112, in the modulator 114 which is carefully balanced to eliminate any component of the modulating signal itself, producing the carrier waveform as at 116, and the scope pattern of FIGURE 2 (F); a double sideband spectrum centered around the carrier frequency. This signal is then passed through the vestigial sideband filter 118 whose high-frequency slope is so chosen as to attenuate the carrier by exactly 6 db (decibels). As a result, the instantaneous in-phase sum of the upper and lower sideband components corresponding to any modulation frequency bears the same relationship to the carrier as it would in double sideband operation. Therefore, an AM detector will not detect any difference between the signal before and after the filtering due to filter 118.

When the two sideband components are out-of-phase, they are also necessarily positioned at 90 degrees with respect to the carrier. Thus, if they are different in amplitude, they will introduce a phase modulation component into the carrier. Phase modulation of the carrier is not itself very serious, but the amplitude modulation that arises from the addition of the carrier and a 90-degree displaced sideband component presents a problem. At this instant in time, which corresponds to the axis crossing of the original modulation, the resultant signal will exceed the carrier level and thus introduce distortion, corresponding to a time displacement of the axis crossings of the modulation envelope. This is minimized by reducing the modulation index so that the carrier is always much greater than any resultant sideband vector. A modulation index of 0.5 has been found very satisfactory, and with this provision, and subject only to a change in scale due to the power amplification of output amplifier 120, the carrier waveform transmitted is sufficiently indicated also by diagram 116. Note that the resultant signal is of very convenient form for binary information, as maximum signal amplitude will represent a "one" or "mark," while a 10 db reduction, to one-third of the maximum level, represents a "zero" or "space."

*Receiver*

The receiver portion of the equipment includes the blocks which occupy the bottom row in FIGURE 1. At the left, signals received over the voice-frequency line or circuit are applied first to the bandpass filter and amplifier 122, to eliminate off-frequency interference and to minimize the noise bandwidth. Thus, the filtering action should freely pass frequencies lying in the bandpass of the voice circuit, or from 300 to 3,000 cycles per second in the example being described herein. A fast-acting automatic gain control amplifier 124 accommodates up to a 50-db signal strength variation in the transmission circuit, and provides the following detector with relatively constant signal level.

Figure 4:
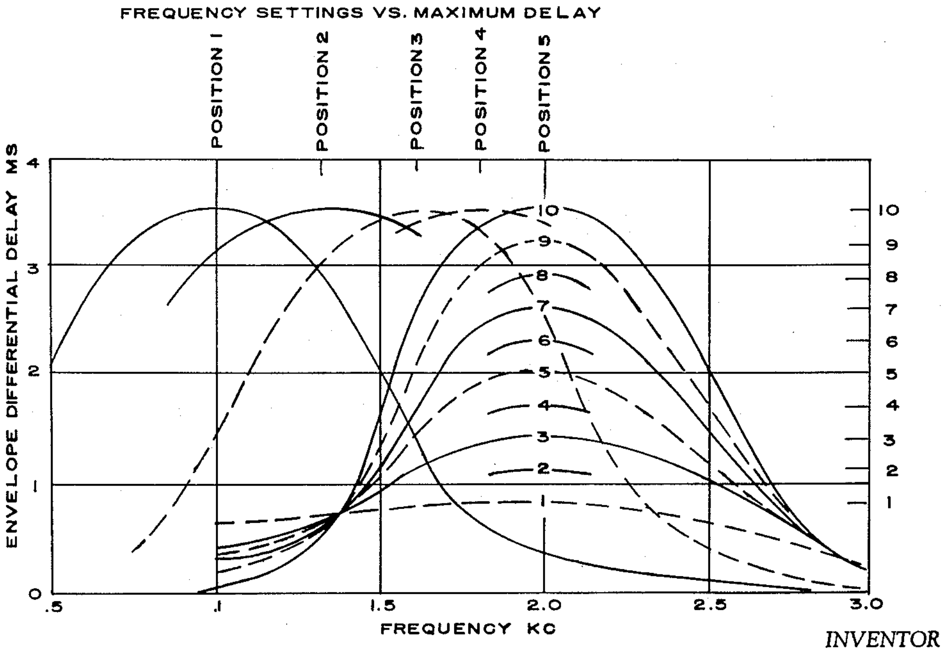
FIGURE 4 is similarly a graphical representation of a set of delay equalizer characteristics incorporated in and forming a part of the receiver portion of the equipment to be described.

Delay equalization is of particular significance for reasons already discussed, and the invention provides such delay equalization in connection with further amplification in block 126; namely, a step-switch control to set the frequency at which maximum delay will be introduced, and a smoothly variable control for selecting the slope of the delay-versus-frequency curve. FIGURE 4 illustrates graphically a preferred set of ranges for these two controls.

The equalized and amplified signal is now passed to the detector 128 and thence through a low-pass filter 130 which removes the carrier frequency component, and whose output thus resembles the waveform 110 at the output of the transmission shaping filter 108. The time jitter due to vestigial sideband transmission, plus degradation in the transmission circuit itself, and in its associated filters, will produce the pattern illustrated in FIGURE 2 (G). Comparison of FIGURE 2 (G) with FIGURE 2 (E) shows the degradation to be expected with the terminal's receiver operated back-to-back with its own transmitter, with no intervening voice frequency transmission circuit.

An automatic gain control (AGC) voltage for control of AGC amplifier 124 is derived from the output of detector 130, and in preparation for synchronous sampling of the detected signals, the same are square-sliced by amplification and horizontal clipping at block 132, so that the processed signal now has one of the two possible polarities, each of fixed amplitude. Axis crossing time is still variable, FIGURE 2 (H), but as long as there is at least a short interval midway between the average position of axis crossing that is undisturbed by random crossings, the signal can be sampled at 134 to determine accurately the polarity of the corresponding information bit. The output wave of the final two-condition flip-flop is shown at FIGURE 2 (I).

A locally generated time standard is employed to accomplish this sampling exactly at the midpoint in time between axis crossings. The sharp spikes in FIGURE 2 (H), midway between average axis crossings, indicate the timing of the sampling pulses. The output circuit includes a flip-flop set to correspond with the polarity of the signal at the time of sampling, and since this output device can only change state following the sampling pulse, it will produce a fully regenerated signal completely free of time or amplitude jitter, as indicated at 136.

TIMING CIRCUITS AND DELAY EQUALIZING TECHNIQUE

The basic time standard of the equipment is a 100 kc. crystal oscillator at 138, contained in a stable temperature environment, with provision for a slow change in oscillator frequency under suitable control to be later described. Thus, after appropriate frequency division of the oscillator output, selectable to provide output pulses selectively at the three built-in rates of 2,500, 1,667 or 1,500 bits per second, a sinusoidal voltage derived from the selected pulses is applied to a phase discriminator 140, through a continuously variable phase shifter 142 (resolver), and each axis crossing from the receiver slicing circuit 132 is applied to the other input of the discriminator. The error signal produced when there is any lack of correspondence in timing between these two inputs is integrated at phase and frequency corrector circuit 144 (to remove the effects of axis-crossing time jitter), and applied to a motor 146 which is connected to drive the phase shifter 142 in the direction to remove this timing error. At the same time, the motor drive introduces a small correction into the frequency of oscillator 138, in the proper direction to reduce the rate of phase correction. Eventually, the oscillator reaches the proper frequency, the phase correction rate drops to zero, and the motor and resolver stop turning. The local time standard is then in exact coincidence with the time standard at the transmitting end, and sampling will coincide with the average midpoint between successive axis crossings.

In order to provide a suitable signal for purposes of alignment of the time standard of the receiving end with that at the transmitter, each terminal is equipped with a random noise source 148 which, together with pulses that are derived from its local timing oscillator 138 (over lead 150), controls a gating circuit 152 and in turn the flip-flop 154, to produce typical but random series of bits at a selected one of the system standard bit rates. Such random pulses are transmitted to the opposite terminal just as would be the significant communication pulses, by operation of the switch 104 to its dashed line position. Each terminal is therefore able to receive random pulse strings during the initial adjustment of the complete channel, to compensate for the circuit conditions then obtaining.

A significant operating feature of the invention is the provision of means permitting a simple manual technique for rapid compensation of the amplitude and delay distortion introduced by the transmission circuit. Using an oscilloscope with its scan time adjusted to be exactly four times a signal element duration, driven from the receiver detected output as from block 132, a pattern like that shown in FIGURE 2 (E) is produced, the random 0–1 and 1–0 transitions yielding a fixed stationary pattern; the axis crossings produced by 0–1 transitions exactly coincide with those produced by 1–0 transitions. An ideal transmission signal will not degrade this pattern, but delay distortion causes the pattern to correspond to FIGURE 2 (A). In the latter presentation, the high frequency components have a fixed time position but the axis varies from cycle to cycle. With this pattern received over the channel from the distant end, the equalization is effected merely by adjusting the "frequency of maximum delay" switch and the continuously variable "delay-versus-frequency" control to reduce the axis shift between successive cycles to a minimum. The proper adjustment is that which provides a pattern most nearly resembling that of FIGURE 2 (E). Amplitude equalization, generally found to be the least significant of the three equalization adjustments, is accomplished by manual adjustment of a multi-position switch (not shown in FIGURE 1) which inserts, ahead of the band pass filter 122, a selected filter section providing any of several attenuation-versus-frequency slopes, up to approximately 15 db per octave, over the channel width range.

PHYSICAL ARRANGEMENT OF THE TERMINAL

FIGURES 5 and 6 illustrate the physical embodiment of the equipment in a rack or cabinet mounted drawer or housing 502, on whose front panel 504 are mounted the controls most frequently requiring adjustment, including the amplitude equalizer 506, telephone volume control 508 (for use when the channel is employed as an order-wire), telephone handset connection 510, indicator lamps 512 to indicate which of the three standard bit rates is being employed, level indicating meter 514, pilot lamps 516 to indicate power-on, oven-on, and the condition of the frequency control having reached its limit of correction, a switch 518 to select as amongst 2-wire, 4-wire or "local" transmission (the latter for alignment purposes using the random bit generator), and knobs 520 and 522 for selecting the amount of delay equalization and the frequency of maximum-delay introduction. Switch 524 selects as amongst "send," "receive" or "remote" operation in the case of 2-wire transmission.

While the invention is not restricted to any particular physical arrangement, the major components of the terminal will be identified, for purposes of reference in FIGURE 5. Thus, numeral 526 designates the switches for delay equalization, connected to the delay equalizer toroid inductors 528, while shielded can 530 contains the master timing oscillator frequency control, the phase adjuster, and the gear train driven by a motor (not shown). The can 532 contains the crystal in a double oven with separate inner and outer oven heaters to be described below. The power supply components are located at numeral 534, and provision is made for the readily-removable mounting of a plurality of printed-circuit module cards as at 536, containing most of the remaining circuit components. In particular, these cards are vertically slidable into and out of a chassis providing two rows of card-receiving slots in a known manner, the circuit connections being automatically made at the bottom of each card as by plug and socket connectors; typical ones of these being indicated, in the case of the double-card switching unit for bit-rate selection, card T—U, by numerals 602 and 604 in FIGURE 6. Connections amongst the bottom connectors 604 are accomplished by a master printed circuit board 606 which lies underneath all of the printed circuit module cards, and mounts the connector 604. To prevent modules from being plugged into wrong positions, keying formations such as pins 612 on the master board cooperate with coded-posiiton slots such as at 614 on the modules.

In the case of double card T—U shown in FIGURE 6, this card may be selectively inserted into any one of three slot positions to perform all of the necessary switching operations to change the standard bit rate amongst the three provided; as for example, 2,500, 1,667 and 1,500 bits per second. The actual card positions are clearly shown, with their interconnections, in FIGURES 7–A and 7–B, which permits detailed circuit tracing deemed not to be essential to a full understanding of the invention claimed herein.

Each of the printed circuit cards also carries, along its upper edge, a test-terminal block to which connections are made for testing and aligning the equipment; such a block is indicated in FIGURE 6 at numeral 608. To facilitate testing operations, there is provided a guide template 610, which is a sheet of transparent plastic insulating material perforated as at 616 to permit the insertion of a test prod through each perforation, these being placed at the more significant test points, without accidental contact with any nearby terminal. Near each perforation there is engraved on the sheet, as at 618, typical voltage or other information, or a typical oscilloscope pattern which ought to be derived at that test point with the equipment in proper condition. The template greatly simplifies alignment and maintenance of the equipment.

INDIVIDUAL CIRCUIT MODULES OR SUB-CIRCUITS

In describing the individual subcircuits or modules, and in order to preserve the significance of the arrangement of the bottom row of card terminals with respect to the over-all schematic of FIGURES 7–A and 7–B, reference to the terminals will be made by the terminal's position number reading from left to right of the card, usually omitting any non-used terminals. The test point leads, to the upper terminal block of each card, have generally been omitted as unnecessary to an understanding of the circuitry; however, for purposes of illustration, such test point leads have been shown in dash lines in the case of FIGURE 22, for card O, the timing circuit module. Test points are also shown along the top of Card T, FIGURE 27. The input, output, power supply and ground terminals for each card have also been appropriately marked in the figures of the drawings.

*Card "A"—FIGURE 8—Random Noise Generator*

This circuit provides a random noise generator feeding a following circuit to simulate a digital intelligence input to the transmitter, for initial adjustment and maintenance of the equipment. Random noise is obtained from diodes 802 and 804, and is amplified in a one to five kc. band-pass amplifier formed by transistors 806, 808, 810 and 812. Positive and negative voltages 30 volts above and below ground potential are provided at terminals 15 and 20, while terminals 10 and 19 are grounded to zero D.C. reference potential, and the noise output is delivered from terminal 18 to terminal 2 of FIGURE 9.

*Card "B"—FIGURE 9—Random Bit Generator and Limiter*

Noise signal input to terminal 2 of Card B is sliced through the axis crossing by transistors 902 and 904 to derive a random square-wave gating pedestal, which is sampled by a transmitter-phased clock pulse applied through transformer 906 from terminal 7 (supplied from sync circuit card Q, FIGURE 24), so that the clock pulse is randomly gated to the commutative input of a flip-flop formed by transistors 908 and 910. The output of the flip-flop is, therefore, a series of bits with durations that are random multiples of the time between clock pulses.

Switch 104 of card B (and also shown in FIGURE 1) selects either the signal from this random bit generator or the digital intelligence from the external equipment (via terminal 14) and applies it to an input limiter consisting of an over-driven amplifier formed by transistors 912, 914 and 916, which standardize the incoming signal amplitude and remove any slope appearing on the leading or trailing edges. Potentiometer 918 adjusts for mark-to-space symmetry, and potentiometer 920 varies the output amplitude of the limiter and thus the modulation index of the transmitter signal. The reference level for operating points of the transistors is established by a voltage reference Zener diode 922 controlling a supply transistor 924, and a wave shaping filter is provided externally to remove any harmonic content from the step transitions and thus to produce a minimum bandwidth signal hereinafter called the transmitter "eye" pattern.

*Card "C"—FIGURE 10—Carrier Oscillator and Modulator*

The transmitter eye pattern from terminal 17 of card B, after passing through the shape filter mentioned, returns to terminal 16 of card C and thus forms one input to a conventional diode ring modulator 1002 whose other input is the carrier oscillator sine wave generated by transistors 1004 and 1006, the tank circuit including capacitors 1008 and 1010 and an external inductor connected at terminals 1 and 2. The modulator output is a double sideband amplitude-modulated signal with a minimum bandwidth envelope, supplied from its output terminals 17 and 18 to card D, FIGURE 11.

*Card "D"—FIGURE 11—Transmitter and Line Amplifier*

The output of the modulator on Card C is applied to terminals 1 and 4 of Card D, FIGURE 11, and there amplified in a two-stage differential amplifier composed of transistors 1102, 1104, 1106 and 1108. It is then filtered by the Vestigial Sideband filter connected externally through terminals 9 and 11 of this Card D, and further amplified by transistors 1110, 1112 and 1114 and applied to the transmission line through transformer 1116 and output terminal 17 of card D to the blocking capacitors on card M, FIGURE 20. The line signal strength may be varied by potentiometer 1118, through a range of +6 to −40 dbm.

RECEIVER MODULES

*Card "R"—FIGURE 25—H Pad and Line Transformer*

The signal applied from the voice frequency transmission circuit to the receiver is first passed through the D.C. blocking capacitors 2502 and twin H pads 2504 and 2506, wherein it is modified by the external amplitude-equalizer potentiometer (connected at terminals 8 and 9 of Card R) for inserting slopes of up to 15 db per octave as earlier described, for amplitude equalization. The signal is then passed via terminal 14 of Card R through the bandpass filter and thence to terminal 7 of Card E.

*Card "E"—FIGURE 12—Preamplifier and Varilosser*

Amplitude-equalized signals from terminal 7 of this circuit are amplified in transistor 1202 and attenuated by the varilosser formed by a ring of stabistors (selected silicon diodes) indicated at 1204, which presents a variable impedance to the signal as a function of the AGC system to be described in connection with FIGURE 15, Card H. The control signal terminals are numbered 11 and 13. The output signal from this portion is thus maintained constant over an input range of 50 db. The leveled signal is further amplified in transistors 1206, 1208, 1210 and 1212 for application to the delay equalizer amplifier now to be described in connection with FIGURE 13. First, however, it may be mentioned that transistors 1214 and 1216 provide incoming signal amplification and control of volume (via terminal 4 leading to the external volume control potentiometer on the front panel, at knob 508 of FIGURE 5) of the received signal at the telephone handset, when such is employed.

*Card "F"—FIGURE 13—Delay Equalizer Amplifier*

The amplitude-compensated signals from Card E, FIGURE 12, pass through external delay-equalizer components providing the range of delays, and frequencies-of-maximum-delay, as earlier described, controlled by front panel switches 520 and 522 (FIGURE 5), and thence arrive at terminals 1, 2, 4, 6, 11, 13, 16, 17 and 18 of Card F, consisting of three tandem, constant-current unity-gain amplifiers 1302, 1304 and 1306, for proper coupling of their associated all-pass networks each of which inserts 360 degrees of phase shift as a function of frequency. The rate at which this phase shift occurs, and the frequency at which it occurs, determines the amount and the frequency, respectively, of the envelope delay inserted in the signal path. FIGURE 4 illustrates the preferred family of delay-compensation functions made available, and the modified signal, appearing at terminals of the delay equalizer controls, is applied to Card G (FIGURE 14).

FIGURE 29 of the drawings details the switch point connections used for the switches 520 and 522 of FIGURE 5, and by which the various delay factors are selected by the user. Plug connector 2902 of FIGURE 29 mates with a similar connector 2903 shown in FIGURE 7–A, in which the wiring to the remainder of the equipment, especially to Card F, FIGURE 13, can be seen.

*Card "G"—FIGURE 14—Amplifier and Detector*

The delay-equalized signal from Card F (and the external switches controlling the latter) is received at terminals 2 and 3 of Card G and amplified by the two-stage differential amplifier composed of transistors 1402, 1404, 1406 and 1408, and detected by the full-wave detector composed of transistors 1410 and 1412 operating in the common-collector mode. The carrier frequency itself is filtered out by the low-pass filter connected externally at terminal 17, leaving the recovered modulation envelope hereinafter called the receiver "eye" pattern.

*Card "H"—FIGURE 15—AGC Control and Amplifier*

*Card "I"—FIGURE 16—Slicer, Sampler and Reversal Detector*

The output of the external low-pass filter is received at terminal 3 of Card H with switch 1502 in its lower position, and thence passes to emitter-follower transistor 1504, which provides one of two signals for the slicer. The other signal is a D.C. reference from the center tap of potentiometer 1506. The slicer, composed of transistors 1602 and 1604 shown in FIGURE 16, squares up the incoming information and removes any amplitude variations. The sliced signal is sampled in both phases by the pulses generated from the receiver-phased sine wave. The result of this sample is applied through diodes 1606 and 1608 to the respective inputs of the flip-flop composed of transistors 1610 and 1612, whose output is the regenerated digital information. Transistor 1614 is a driver amplifier utilizing the regenerated signal to drive the output transistor 1616 whose emitter is voltage-regulated by a Zener diode package on the main chassis, connected between the emitter and ground at terminals 16 and 10 of Card I. The current delivered by transistor 1616 is limited by a power transistor also mounted on the main chassis, and connected to terminals 14, 16 and 18 of Card I.

The recovered signal reversals from slicer transistors 1602 and 1604 on Card I are coupled by diodes 1620 and 1622 to a pulse generator composed of transistors 1624, 1626 and 1628, and pulse-forming magnetic core transformer 1630; the output of this pulse generator is the signal-derived pulses used in the phase discriminator.

The memory diodes 1508 on Card H (FIGURE 15) also provide an infinite memory capability for the AGC system. Because of this capability, the output of the receiver is effectively D.C.-coupled to the input of the transmitter generating the line signal.

The receiver eye pattern is applied directly to one end of the memory diode bank 1508 from terminal 4, and a phase inverted signal is fed back to the other end via resistor 1510 from the slicer, via terminal 2. The resulting voltage across the diode bank 1508 is of proper amplitude and polarity to maintain a constant D.C. level regardless of the polarity of the incoming signals in digital form; that is, independent of mark or space condition. This D.C. level being solely dependent upon absolute line signal strength, it provides an ideal AGC control signal. However, to avoid stability problems associated with D.C. amplifiers otherwise required to raise it to a suitable level for control, the AGC signal is used to modulate 50 kc. pulses obtained from the first stage of binary pulse divider (to be described). The modulation takes place at transistor 1512, the AGC modulator. A 50 kc. tuned circuit at 1516 in the collector circuit of transistor 1512 resonates with an amplitude proportional to the D.C. modulating signal, and thus proportional to the line signal strength. The output of the secondary winding of the transformer at 1516 is full-wave rectified by the diode bridge 1518, filtered and applied to the varilosser which was described in connection with FIGURE 12, to maintain the recovered signal at the desired level. The output terminals for this control are at 17 and 18.

Transistor 1520 on Card H is a slicer limiter used in the digital repeater output. When switch 1502 is placed in the upper (repeater input) position, the output of 1520 replaces the receiver eye pattern from terminal 3, and all of the following circuits function as already described.

TIMING CIRCUITRY

*Card "S"—FIGURE 26—Master Oscillator*

The master oscillator provides a high-stability timing information source for the equipment, and is mounted on printed circuit Card S, the wiring schematic being shown in FIGURE 26. The card is physically located inside the "coarse" or outer oven of the crystal, the crystal itself, and its associated capacitors being located inside the "fine" or inner oven. The crystal tuning capacitor is mounted on the gear train. On Card S, a silicon NPN transistor 2602 provides the gain to sustain oscillation. Diodes 2604 and 2606 standardize the voltage driving level to the crystal; transistors 2608 and 2610 are used as buffer emitter followers to minimize loading effects. The output of the master oscillator, at terminal 9, is a 100 kc. sine wave of approximately 1.5 volts peak-to-peak.

*Card "L"—FIGURE 19—Sine to Pulse Converter*

The 100 kc. sine wave from the master oscillator is applied to Card L, FIGURE 19, and there it is amplified by transistors 1902 and 1904 and is sliced by differential amplifier transistors 1906 and 1908, to switch the square hysteresis-loop core 1910. The pulse generated by this core is then amplified by transistor 1912 to provide a 50 milliampere output pulse at the rate of 100,000 per second.

*Card "N"—FIGURE 21—Pulse Dividers*

This module mounts eight binary-pulse frequency dividers, designated by numerals from 2102 through 2116. Inserting the switching Card T—U in a given bit-rate slot in the chassis provides appropriate feedback loops to these dividers to establish a division ratio such that the output of this card will be equally spaced pulses occurring at the selected bit rate. At 2,500 bits per second, the spacing between output pulses will be 400 microseconds; at 1,667 bits per second, the spacing will be 600 microseconds. At 1,500 bits per second, however, and since this is not an integral division product of 100 kc., it is necessary to divide by three times the expected divisor to obtain pulses at 500 per second, and then multiply by three in a following stage.

*Card "T—U"—FIGURES 27 and 28—Pulse Dividers*

Card T contains the resistors and capacitors as shown to provide the necessary feedback and connection paths within Card N to establish the desired division ratio, and to make the necessary external-circuit connections to supply the necessary outputs for use. Card U, consisting merely of interconnected terminals for the alteration of other external circuit paths, is secured to Card T, and the whole unit is pluggable into any of the three possible positions as indicated in FIGURE 7–A.

*Card "O"—FIGURE 22—Pulse to Sine Converter*

The output pulses from the pulse dividers pass through the primary winding of a toroidal transformer T–2 mounted on the main chassis, the secondary winding thereof being resonated at the selected bit rate by the capacitors located on the switching card T—U. Since the pulses applied in the 1,500 bit-per-second mode are in reality only occurring at 500 per second, there is a considerable difference in the amplitude of the sine wave at the output of T–2 as a function of the bit rate. This sine wave is therefore squared up and amplified by transistors 2202 and 2204 on Card O, and applied to slicers 2206 and 2208. The output taken from the collector of 2208 is a square wave at the bit rate. This square wave drives a second circuit that is resonated at the bit rate and is composed of a toroidal inductor L–1 (on the main chassis) and capacitors located on the switch Card T—U. Thus the square wave is converted once again to a sine wave, but is in cleaner form and less subject to amplitude variations. Transistor 2210 functions as an emitter follower to prevent loading of this resonant circuit, and has an operating point of +5 volts. To further reduce variations in amplitude of this sine wave, transistor 2212 performs an AGC function that reduces the square wave drive to the resonant tank if any portion of the sine wave goes negative with respect to ground. Thus the master-timing sine wave at the emitter of transistor 2210 will always have an amplitude of approximately 10 volts, peak-to-peak.

*Card "Q"—FIGURE 24—Transmitter Phased Output Sync*

The master-timing sine wave generated as above serves several functions, one of which is to provide the signal for the transmitter phased output circuit located on Card Q. Transistors 2402, 2404, 2406 and 2408 amplify this sine wave and provide the transmitter-phased signal whose amplitude is controlled by the potentiometer 2410. Transistors 2412, 2414 and 2416, together with the square hyteresis loop core transformer 2418 generates a pulse at the axis crossing time of this sine wave, for use in triggering the random bit generator described in connection with Cards A and B.

*Card "P"—FIGURE 23—Receiver Phased Output Sync*

The master-timing sine wave from Card O is also applied to the continuously-variable phase shift network mounted on the gear train of the external chassis, and the output of the phase shift circuit is fed back to the Receiver Phased Output circuit located on Card P. It is there amplified by transistors 2302, 2304, 2306, 2308 and 2310 to provide the receiver phased synchronization already discussed. Transistor 2312 on Card P, together with transistors 1914, 1916 and 1918 on Card L (FIGURE 19) generate a pulse at the axis crossing of this sine wave, for use in the sampling circuit of the receiver.

*Card "J"—FIGURE 17—Phase Discriminator and Motor Amplifier*

The phase-shifted sine wave just described is also applied to Card J, where it passes through transformer 1702 from transistor 1704, the transformer furnishing at its secondary the 180 degree phased voltages for push-pull amplification in transistors 1706 and 1708. The latter transistors are reverse biased by 5 volts, and the sine wave amplitude is not sufficient to cause them to conduct. The addition of a pulse derived from the received digital information and applied through transformer 1710 will cause one or both of the latter transistors to conduct as a function of the relative time at which this pulse occurs. Conduction current of the transistors is integrated in their respective emitter circuits and amplified by transistors 1712 and 1714, and then further amplified by external transistors connected as power emitter followers and capable of driving the timing motor attached to the gear train above described. The power output from Card J to these power transistors is at terminals 11 and 13. The motor, after suitable gear reduction, rotates the phase shifter resolver and through additional gear reduction rotates the variable capacitor in the master oscillator circuit. The rotation continues until a signal balance is obtained at the emitters of transistors 1706 and 1708 of Card J, a condition which exists only when the incoming (signal-derived) pulses occur exactly at the axis crossing of the receiver-phased sine wave. Finally, transistors 1716 and 1718 of Card J provide a standby squelch for the timing motor. In the absence of signal derived pulses, transistor 1716 saturates and effectively grounds the collectors of transistors 1712 and 1714, over diodes 1720 and 1722. Thus the timing motor cannot rotate when there is no synchronizing information.

AUXILIARY CIRCUITRY

*External Bit Rate*

When the External Bit Rate switch (538 of FIGURE 5) is placed in any position other than "Internal," the first resonant tank of the pulse-to-sine converter is switched out of the circuit. The second resonant tank is replaced by a toroidal inductor L–2 and capacitors C–1, C–2 or C–3, which are mounted on the main chassis. The operation is the same as already described, except that inductor L–2 must be manually adjusted to provide the desired rate. The external bit rate knob is shown at 540 in FIGURE 5.

CRYSTAL OVEN CIRCUITRY

FIGURE 31 shows the schematic wiring diagram for the crystal oven and its heaters and controls, these parts being mounted on a separate plug-in module of the main chassis, located at 532 in FIGURE 5. To achieve the high stability required of the timing circuits, the master oscillator and its associated components are placed in a temperature-controlled environment, namely the crystal oven. The outer or coarse oven, housing the oscillator amplifiers, is thermostatically controlled to 55 degrees C., plus or minus 1 degree, by the heater 3102. Power supply for this coarse oven heater is supplied by a filament transformer on the main chassis, not controlled by the A.C. main power switch. The inner or fine oven, housing the 100 kc. crystal itself, has a proportional control located on Card K (FIGURE 18) which controls the heater 3104 to within plus or minus $1/100$ of a degree C. at a temperature of 60 degrees. In this way the crystal is well isolated from temperature changes of the external environment of the equipment.

FIGURE 31 also shows the timing motor 3106, resolver phase shifter 142 (also in FIGURE 1), limit switch 3110, crystal-frequency adjusting capacitor 3112, and their related wiring, as generally described in functional terms in connection with FIGURE 17 and Card J.

POWER SUPPLY

The power supply for the various voltages required in the equipment is conventional and largely self-explanatory, but is shown in FIGURE 30, wherein line transformer 3002 is connected to A.C. line input terminals 1 and 2, and a 6.3 volt A.C. output is provided at terminals 3 and 4. Full-wave bridge rectifiers 3004 and 3006, and appurtenant filters 3008 and 3010, provide positive and negative D.C. voltages as required, and have a common terminal at 7, 8, 9 and 10, the positive and negative outputs appearing at terminals 5 and 6, respectively.

While the invention has been disclosed herein in considerable detail, in order to enable those skilled in this art to make use thereof, it is to be understood that the principles of the invention can also be carried out with specifically different arrangements. It is not intended to exclude such modifications from the scope of the invention, except as may be required by the fair meaning of the appended claims.

What is claimed is:

1. A system for the high speed communication of binary electrical information over a channel characterized by limited bandwidth and substantial phase and amplitude distortion, comprising a transmitter connected to one terminal of said channel, said transmitter including a carrier oscillator having a frequency near the upper extremity of the channel band, a balanced modulator supplied jointly by said oscillator and by D.C. input information signals having a predetermined repetition rate, and lower sideband filter means connected between said modulator and said one channel terminal for supplying to the latter signals lying substantially entirely within said limited bandwidth; and a receiver connected to the opposite terminal of said channel, said receiver comprising automatic gain control means for compensating the amplitude distortion of said channel, selectable phase delay equalizing means for compensating the differential time delay characteristics of said channel within said bandwidth, a detector connected to the output of said equalizing means for recovering the amplitude modulation envelope of the transmitted side band substantially free from time jitter relative to the instants of amplitude change of said D.C. input information signals, shaping means connected to the output of said detector for square-shaping the recovered modulation signals, sampling means including a sampling pulse generator synchronously controlled in accordance with the average repetition rate of the square pulses derived from said shaping means, and two-condition output circuit control means fed by said shaping means and conditioned by said sampling means to change its condition state only during short intervals substantially midway between the instants of axis-crossing of the squared output wave of said shaping means.

2. A system in accordance with claim 1, in which said sampling means includes phase-shifting means connected between said sampling pulse generator and said output circuit control means, a phase-difference discriminator having phase-comparison inputs connected respectively to the outputs of said detector and of said phase-shifting means, and means controlled by the output of said discriminator for adjusting said phase-shifting means so as to condition said output circuit control means only during said short intervals.

3. A system in accordance with claim 2, including means controlled by the output of said discriminator for adjusting the frequency of said pulse generator to agree with the average frequency of the output signals from said detector.

4. A system in accordance with claim 1, including a random-polarity keyer controlled as to frequency by said sampling pulse generator, and means for selectively connecting the output of said keyer to said channel.

5. A system in accordance with claim 4, in which the means for selectively connecting the output of said keyer to said channel comprises a transmitter connected to said channel, said last-named transmitter including a carrier oscillator having a frequency near the upper extremity of the channel band, a balanced modulator supplied jointly by said last-named oscillator and by the random-polarity output signals of said keyer, and lower sideband filter means connected between said modulator and said channel.

6. Terminal apparatus for a telegraph signal system of the synchronous serial bit type, comprising received-signal amplifying and phase-delay compensating means for restoring the regular cadence of mark-space transitions, a sampling signal generator, a two-condition output circuit adapted to change from one condition to the other in accordance with mark-space signals applied to its input, means controlled by said generator for coupling said compensated signals to said output circuit only during successive intervals which are substantially shorter than the shortest interval between successive mark-space transitions of the received and compensated signals, and means controlled by the received signals for automatically regulating the timing of said generator.

7. Terminal apparatus in accordance with claim 6, including a phase-comparison discriminator connected to compare the timing of received signals at the output of said compensating means with the timing of pulses produced by said sampling signal generator; said discriminator constituting a part of said automatic regulating means.

8. Telegraph terminal equipment for systems of the synchronous serial bit type, comprising a transmitter having input and output terminals, a receiver having input and output terminals, a sampling pulse generator including a master timing oscillator connected to control signal-sampling means forming a part of said receiver, a random-polarity signal source, means for selectively connecting the output of said signal source to the input of said transmitter, and gating means connected between said oscillator and said random-polarity signal source, to provide channel test signals at a synchronous rate compatible with the sampling rate of said receiver.

References Cited in the file of this patent

UNITED STATES PATENTS

| | | |
|---|---|---|
| 2,611,824 | Van Duuren | Sept. 23, 1952 |
| 2,706,215 | Van Duuren | Apr. 12, 1955 |
| 2,805,280 | Walker et al. | Sept. 3, 1957 |
| 2,901,541 | Kenyon | Aug. 25, 1959 |
| 2,945,989 | Vogel et al. | July 19, 1960 |
| 2,951,185 | Buck | Aug. 30, 1960 |